(12) United States Patent
Okubora et al.

(10) Patent No.: US 7,306,689 B2
(45) Date of Patent: ***Dec. 11, 2007

(54) OPTICAL WAVEGUIDE AND METHOD FOR PRODUCING SAME

(75) Inventors: Akihiko Okubora, Kanagawa (JP); Tsuyoshi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/994,146

(22) Filed: Nov. 19, 2004

(65) Prior Publication Data

US 2005/0100298 A1 May 12, 2005

Related U.S. Application Data

(62) Division of application No. 10/301,008, filed on Nov. 21, 2002, now Pat. No. 7,163,598, which is a division of application No. 09/422,255, filed on Oct. 21, 1999, now abandoned.

(30) Foreign Application Priority Data

Oct. 27, 1998 (JP) ............................ P10-306090
Apr. 27, 1999 (JP) ............................ P11-120631

(51) Int. Cl.
*B44C 1/18* (2006.01)
*G02B 6/122* (2006.01)
*G02B 6/036* (2006.01)
*B44C 1/24* (2006.01)
*G02B 6/136* (2006.01)

(52) U.S. Cl. .................... 156/239; 156/235; 385/14; 385/123

(58) Field of Classification Search ............... 156/230, 156/233, 235, 237, 231, 240, 241, 244.17, 156/247, 289; 427/146, 147, 148, 162, 164, 427/165, 167, 96; 428/40.4, 41.5, 41.8, 42.2, 428/195, 203, 344, 914; 385/14, 147
See application file for complete search history.

(56) References Cited

U.S. PATENT DOCUMENTS

| | | |
|---|---|---|
| 4,169,001 A | 9/1979 | Kaiser |
| 5,208,879 A | 5/1993 | Gallo et al. |
| 5,390,275 A | 2/1995 | Lebby et al. |

(Continued)

FOREIGN PATENT DOCUMENTS

JP 06310833 A * 11/1994

*Primary Examiner*—Melvin Mayes
*Assistant Examiner*—Sonya Mazumdar
(74) *Attorney, Agent, or Firm*—Sonnenschein Nath & Rosenthal LLP

(57) ABSTRACT

An optical waveguide having a optical waveguide path capable of securing a high light propagation characteristic regardless of the type of a supporting base, provided with a multilayer circuit board, an optical waveguide path arranged on the multilayer circuit board, a light receiving element, IC chips, and a light emitting element, the optical waveguide path formed on a transparent substrate excellent in flatness and transferred to the multilayer circuit board. The light propagation loss becomes small, and a signal to be transmitted at a high speed being transmitted as a light signal and a signal which can be transmitted at a relatively low speed being transmitted as an electrical signal, whereby the signal propagation delay which becomes the problem when a signal is transmitted by only electrical wiring is overcome, and the influence of electromagnetic noise becomes small.

15 Claims, 18 Drawing Sheets

U.S. PATENT DOCUMENTS

| | | |
|---|---|---|
| 5,394,490 A | 2/1995 | Kato et al. |
| 5,822,475 A | 10/1998 | Hirota et al. |
| 6,132,543 A * | 10/2000 | Mohri et al. ............. 156/89.12 |
| 6,343,171 B1 * | 1/2002 | Yoshimura et al. ........... 385/50 |
| 7,163,598 B2 * | 1/2007 | Okubora et al. ............ 156/249 |

* cited by examiner

OPTICAL WAVEGUIDE AND METHOD FOR PRODUCING SAME

RELATED APPLICATION DATA

The present application claims priority to Japanese Application No. P 10-306090, filed Oct. 27, 1998, and Japanese Application No. P11-120631, filed Apr. 27, 1999, and is a divisional of U.S. application Ser. No. 10/301,008 filed Nov. 21, 2002 now U.S. Pat. No. 7,163,598, which application is a divisional of U.S. application Ser. No. 09/422,255, filed Oct. 21, 1999 now abandoned, all of which are incorporated herein by reference to the extent permitted by law.

BACKGROUND OF THE INVENTION

1. Field of the Invention

The present invention relates to an optical waveguide provided with an optical waveguide path through the inside of which a light signal is propagated and a method for producing the same, more particularly relates to a optical waveguide suitable for transmitting a light signal in an ultra high speed signal processing circuit or parallel type digital signal processing circuit or other signal processing circuit, optical communication, and optical connection of an optical link or optical fiber channel etc. to an optical module and a method for producing the same.

2. Description of the Related Art

In recent years, due to the dramatic improvements in wireless telecommunications technology used for cellular telephones and the like, wired telecommunications technology used in integrated service digital networks (ISDN) and the like, and the processing capabilities of personal computers (PC) and other data processing devices and to the digitalization of audiovisual (AV) apparatuses and so on, there has been an ongoing movement toward transferring all kinds of media via data communications networks. Further, use of the Internet, first and foremost, and local area networks (LAN) and wide area networks (WAN) and other such data communications networks is now spreading in business and among individuals. Due to this, an environment will be realized in the future in which household electrical appliances and AV equipment are connected in the home through a PC to form a network in which information will be able to be freely transferred through a telephone line, CATV (cable television or community antenna television) line, ground wave television channel, or satellite broadcast or satellite communication channel or other data transmitting means.

In order to freely transfer image data handled at a high speed of several Mbps to 10 or more Mbps by such a data transmitting means, a data transmission rate of for example about 10 Mbps to 1 Gbps is demanded. Optical communications and transmission technology can realize such data transmission rate. For example, in a so-called trunk system telecommunications network extending over 10 km to 100 km such as an optical cable laid on the bottom of the sea, wide use is being made of optical communications and transmission technology due to their low loss and economy.

On the other hand, as the means for transmitting data over a relatively short distance, for example, between boards in an apparatus or between chips on a board, use has mainly been made of wired communications and transmitting means such as twisted pair cables or coaxial cables. Recently, although optical fiber channels and optical data links and other technology for using optical transmission have begun spreading in use, at the present time they have not yet spread to an extent of the optical communications and transmitting means replacing wired communications and transmitting means. One of the reasons for this is the issue of cost versus effect. Specifically, for example, there can be mentioned the points that, in order to maintain the performance of optical communications (for example, transmission rate and transmission quality), technology is required for precise positioning between a light emitting element and a light receiving element constituting the optical communications device and the optical fiber, that countermeasures for light leakage, consideration of electromagnetic interference, and countermeasures to noise are necessary, and that, as a result, the device becomes complex and expensive etc.

On the other hand, advances in the technology for integrated circuits (IC) and large scale integrated circuits (LSI) have led to improvements in operating rates and scales of integration. For example, rapid improvements are being made in the performance of microprocessors and the capacity of memory chips. Further, amounts of data being handled by PCs connected by networks are rapidly growing as well. Accordingly, the issues have arisen of how to deal with the rise in the frequency of the signal processing clocks, the rise in the degree of parallel operation, and the rise in the speed of the access to the memories. In view of this situation, semiconductor chips are being miniaturized and the gate lengths of the transistors reduced along with this and the driving capabilities being improved so as to increase the operating rate inside semiconductor chips. In memory access circuits and processors of multi-microprocessor (MPU) configurations, however, the parasitic capacitance component of the portion which becomes necessary at the time of mounting, for example, the package of the semiconductor device, is large, so high speed signal transmission operation becomes difficult in the electric wiring connected to the outside of the semiconductor chips. Further, application of a high speed signal to the electric wiring can cause spikes in the current or the voltage and can cause electromagnetic interference (EMI) and other types of electromagnetic interference noise, reflection noise, and crosstalk noise.

Therefore, in order to transmit high speed signals even between semiconductor chips on a circuit board and other short distance signal transmission routes, for example, it is considered desirable that the signals be transmitted by light and that, in particular, use be made of an optical transmission and communications system using an optical waveguide path as the transmission path. When transmitting a signal by light, the signal delay due to the "CR" time constant (C: capacitance of the wiring, R: resistance of the wiring) of the wiring can be eliminated and the influence of electromagnetic noise can be avoided, therefore transfer of high speed signals becomes possible. Accordingly, it is necessary to maintain the communications performance of optical communications and transmission equal to the communications performance of wired communications and transmission, and realize a reduction of the costs in order to promote the use of short distance optical communications and transmission systems even in the field of equipment for general users.

In order to maintain the communications performance of optical communications and transmission equal to the communications performance of wired communications and transmission, it is required that for example the light propagation loss of the optical waveguide path be kept small. As a material having a small light propagation loss satisfying this condition, there is a quartz-based material. Quartz has an extremely good light transmission property as has already been proved by optical fibers. When an optical waveguide path is prepared by quartz, a reduction of the loss to less than 0.1 dB/cm is achieved.

FIG. 32 is a view of an example of the configuration of an optical waveguide of the related art (see Japanese Unexamined Patent Publication (Kokai) No. 62-204208). This optical waveguide is comprised of a flat silicon substrate 501 on which are formed thin film multilayer wiring 505 with the wiring insulated from each other by an insulating layer 506 and on which are provided an optical waveguide path 502 made of quartz and an LSI 504. Further, above each end region of the optical waveguide path 502, a light receiving element 503 and a light emitting element (not illustrated) are formed and electrically connected to the LSI 504 arranged in their vicinity. In this optical waveguide, the light signal emitted from the not illustrated light emitting element is propagated inside the optical waveguide path 502, reflected at an end surface 502a, and made to strike the light receiving element 503.

As the method for producing an optical waveguide having such a configuration, there is known the method of forming the optical waveguide path 502 on the silicon substrate 501 on which the thin film multilayer wiring 505 are formed, then using for example reactive ion etching (RIE) or other anisotropic etching to process the end surface 502a of the optical waveguide path 502 so as to become approximately 45° with respect to the surface of the silicon substrate 501 and then further mounting the light receiving element 503, light emitting element, and LSI 504 on the silicon substrate 501.

Summarizing the disadvantage, in the method for producing the optical waveguide mentioned above, however, since the optical waveguide path 502 made of quartz is supposed to be formed on the silicon substrate 501, thin film technology had to be used for forming the optical waveguide path 502. Formation of the optical waveguide path 502 using thin film technology results in an excellent dimensional accuracy, but conversely has the disadvantage that the formation and processing of a film having a thickness of no more than several µm are difficult.

Further, even if a signal can be transmitted at a high speed by light, the electric power has to continue to be supplied and various control signals of relatively low speed etc. have to continue to be transmitted by electrical wiring (electrical signals). For this reason, it suffers from the disadvantage that while it is essential to form the thin film multilayer wiring 505 as the electrical wiring on the silicon substrate 501, this electrical wiring forming region would be too costly and poor in practicality if being the usual circuit board size (several 10s of cm square) or module size (several cm square).

In order to overcome the disadvantage, it can be considered to form the optical waveguide path on a printed circuit board on which the electric components can be mounted. The surface of a circuit board fabricated by such a thick film process, however, has thick films of metal formed by for example a plating process and therefore has a large unevenness. For this reason, if the optical waveguide path is formed on such a printed circuit board, the disadvantage arises that the uneven shape of the surface of the board will end up having an effect on the shape of the optical waveguide path and end up leading to an increase of the light propagation loss of the optical waveguide path and a reduction of the dimensional accuracy.

Further, in the wet etching or washing etc. when forming the optical waveguide path on a circuit board, a step of immersing the entire board in acidic and alkaline solutions or organic solvents or the like becomes necessary, therefore there is the problem of the board being liable to be damaged. Further, the board is also liable to be damaged at the time of dry etching or the time of the high temperature heat treatment. Accordingly, it is difficult to use a circuit board formed by the thick film process as the substrate, so it was necessary to use an expensive substrate having a high heat resistance and other characteristics.

SUMMARY OF THE INVENTION

An object of the present invention is to provide an optical waveguide having an optical waveguide path capable of securing high light propagation characteristics regardless of the type of the supporting base and a method for producing the same.

Another object of the present invention is to provide an optical waveguide in which the optical waveguide path is inexpensively formed and by which the manufacturing cost can be lowered and a method for producing the same.

Still another object of the present invention is to provide an optical waveguide enabling the transmission of a further higher speed signal which had been difficult to realize by only electrical wiring, and capable of improving the electromagnetic noise resistance property of the transmission signal and a method for producing the same.

According to a first aspect of the present invention, there is provided an optical waveguide comprising a substrate and an optical waveguide path which is separately formed in advance so that the light signal can be propagated inside it and then is arranged on and secured to the substrate.

According to a second aspect of the present invention based on the first, electrical wiring is formed on the substrate.

According to a third aspect of the present invention based on the first, the optical waveguide further comprises on the substrate at least one of a light emitting element for converting an electrical signal to a light signal and a light receiving element for converting a light signal to an electrical signal.

According to a fourth aspect of the present invention based on the third, the optical waveguide further comprises on the substrate an integrated circuit for transferring an electrical signal with the at least one of the light emitting element and light receiving element.

According to a fifth aspect of the present invention based on the first, the optical waveguide path is formed on another substrate different from the substrate and then transferred from that other substrate to the substrate.

According to a sixth aspect of the present invention based on the first, the optical waveguide path is provided at least at one end with a light reflecting portion having at least one of a function of reflecting a light signal from the outside into the optical waveguide path and a function of reflecting a light signal propagated through the optical waveguide path out of the optical waveguide path.

According to a seventh aspect of the present invention based on the sixth, the optical waveguide path is comprised of a core layer and a cladding layer and the light reflecting portion is provided at least at one end of the core layer.

According to an eight aspect of the present invention based on the second, the optical waveguide further comprises on the substrate at least one of a light emitting element for converting an electrical signal to a light signal and a light receiving element for converting a light signal to an electrical signal and an integrated circuit for transferring an electrical signal with the at least one of the light emitting element and light receiving element and the optical waveguide path is formed at least at one end with a light reflecting portion for inputting or outputting a light signal.

According to a ninth aspect of the present invention based on the eighth, the electrical wiring of the substrate supplies electric power to the at least one of a light emitting element and light receiving element and the integrated circuit.

According to a 10th aspect of the present invention based on the eighth, the electrical wiring of the substrate is for electrically connecting the at least one of a light emitting element and light receiving element and the integrated circuit.

According to an 11th aspect of the present invention based on the eighth, the substrate is a multilayer circuit board comprised of a plurality of electrical wiring layers stacked via insulators.

According to a 12th aspect of the present invention based on the eighth, the optical waveguide path is comprised of a first cladding layer formed on the substrate, a core layer stacked on the first cladding layer, and a second cladding layer stacked on the core layer.

According to a 13th aspect of the present invention based on the 12th, the first cladding layer also serves as the bonding layer.

According to a 14th aspect of the present invention based on the eighth, the bonding layer is comprised of a photo-curing resin.

According to a 15th aspect of the present invention based on the eighth, the bonding layer is comprised of a heat-curing resin.

According to a 16th aspect of the present invention based on the eighth, the at least one of a light emitting element and light receiving element and the integrated circuit are connected by connection electrodes to the electrical wiring of the substrate.

According to a 17th aspect of the present invention based on the 16th, the connection electrodes are comprised of spherical bodies made of an electroconductive material coated with a solder.

According to an 18th aspect of the present invention based on the 16th, the connection electrodes are comprised of a solder comprised mainly of lead (Pb) and tin (Sn).

According to a 19th aspect of the present invention based on the eighth, the optical waveguide path is one which transmits a transmitted signal at a first rate and the electrical wiring of the substrate is one which transmits a transmitted signal at a second rate slower than the first rate.

According to a 20th aspect of the present invention based on the eighth, at least one of the light emitting element, light receiving element, and integrated circuit is arranged on the substrate using the optical waveguide path as a spacer interposed between it and the substrate.

According to a 21st aspect of the present invention based on the eighth, the light reflecting portion is comprised of an inclined surface formed at least at one end of the optical waveguide path and has at least one of a function of reflecting a light signal from the outside into the optical waveguide path and a function of reflecting a light signal propagated through the optical waveguide path outside of the optical waveguide path.

According to a 22nd aspect of the present invention based on the 21st, the inclined surface is inclined approximately 45° with respect to a direction of light propagation in the optical waveguide path.

According to a 23rd aspect of the present invention based on the 11th, the insulator of the multilayer circuit board is comprised of an inorganic material including at least one material selected from the group comprising alumina ($Al_2O_3$), a glass ceramic, aluminum nitride (AlN), and mullite.

According to a 24th aspect of the present invention based on the 11th, the insulator of the multilayer circuit board is comprised of an organic material including at least one material selected from the group comprising a glass epoxy resin, a polyimide, BT resin, polyphenyl ether (PPE) resin, phenol resin, and polyolefin resin.

According to a 25th aspect of the present invention, there is provided a method for producing an optical waveguide comprising a step of forming an optical waveguide path using a first substrate as a supporting base, a step of securing the optical waveguide path supported by the first substrate together with a second substrate, and a step of removing the first substrate so as to transfer the optical waveguide path to the second substrate.

According to a 26th aspect of the present invention based on the 25th, the step of securing the optical waveguide path and the second substrate uses an adhesive.

According to a 27th aspect of the present invention based on the 26th, a photo-curing resin is used as the adhesive.

According to a 28th aspect of the present invention based on the 27th, a substrate comprised of a light transmitting material is used as the first substrate and the photo-curing resin is cured by irradiating light through the first substrate.

According to a 29th aspect of the present invention based on the 26th, the step of forming the optical waveguide path and the step of securing the optical waveguide path and the second substrate include a step of forming a core layer, a step of forming a resin layer serving as a cladding layer so as to surround the core layer, a step of using the resin layer in the uncured state as the adhesive and bonding together the optical waveguide path supported by the first substrate and the second substrate, and a step of curing the resin layer to form the cladding layer and simultaneously completing the securing of the optical waveguide path to the second substrate.

According to a 30th aspect of the present invention based on the 25th, the step of forming the optical waveguide path includes a step of forming a substrate separation layer between the first substrate and the optical waveguide path so as to enable the first substrate to be separated from the optical waveguide path in a later step and, in the step of transferring the optical waveguide path to the second substrate, the substrate separation layer being removed to remove the first substrate.

According to a 31st aspect of the present invention based on the 30th, the substrate separation step is formed by silicon dioxide ($SiO_2$).

According to a 32nd aspect of the present invention based on the 25th, a substrate comprised of a material which can be dissolved by a predetermined solution is used as the first substrate and, in the step of transferring the optical waveguide path to the second substrate, the first substrate is dissolved so as to remove it.

According to a 33rd aspect of the invention based on the 32nd, the solution is a not more than 5 vol % hydrofluoric acid (HF) solution and the dissolvable material is a photo-sensitive glass.

According to a 34th aspect of the present invention based on the 25th, the step of forming the optical waveguide path on the first substrate includes a step of forming a plurality of optical waveguide paths spaced from each other and the step of securing the optical waveguide path and the second substrate includes a step of bonding the second substrate to the optical waveguide paths through an adhesive comprised of a photo-curing resin, a step of irradiating light to the bonding layer through the first substrate to selectively expose and cure only regions of the bonding layer corresponding to the optical waveguide paths, and a step of removing the uncured photo-curing resin on the second substrate.

According to a 35th aspect of the present invention based on the 34th, before the step of bonding the second substrate to the optical waveguide paths, there is further a step of forming a light blocking film at the regions of the first substrate other than the regions where the optical waveguide paths are formed and the side surfaces of the optical waveguide paths, the light blocking film being used as a mask for selective exposure.

According to a 36th aspect of the present invention based on the 35th, the step of forming a light blocking film includes a step of forming a peeling layer at a surface of the optical waveguide paths to which the second substrate is secured, a step of forming a light blocking film over the entire exposed surface of the first substrate, optical waveguide paths, and peeling layer, and a step of removing the peeling layer so as to selectively remove the light blocking layer in contact with the peeling layer.

According to a 37th aspect of the present invention based on the 25th, the method further comprises a step of forming on the second substrate at least one of a light emitting element for converting an electrical signal to a light signal and a light receiving element for converting a light signal to an electrical signal.

According to a 38th aspect of the present invention based on the 37th, the method further comprises a step of forming on the second substrate an integrated circuit for transferring an electrical signal with the at least one of the light emitting element and light receiving element.

According to a 39th aspect of the present invention based on the 25th, the second substrate is an electrical circuit board formed with electrical wiring.

According to a 40th aspect of the present invention based on the 39th, the method further comprises a step of forming on the second substrate at least one of a light emitting element for converting an electrical signal to a light signal and a light receiving element for converting a light signal to an electrical signal and a step of forming on the second substrate an integrated circuit for transferring an electrical signal with the at least one of the light emitting element and light receiving element.

According to a 41st aspect of the present invention based on the 40th, the method further comprises a step of sealing the at least one of a light emitting element and light receiving element and the integrated circuit by a sealing resin material.

According to a 42nd aspect of the present invention based on the 40th, the step of forming an optical waveguide path using the first substrate as a supporting base includes a step of forming a substrate separation layer on the first substrate so as to enable the first substrate and the optical waveguide path to be separated, a step of forming an optical waveguide path on the substrate separation layer, and a step of forming at inclined surface at least at one end of the optical waveguide path.

According to a 43rd aspect of the present invention based on the 42nd, the step of forming the optical waveguide path includes a step of forming a first cladding layer on the substrate separation layer, a step of forming a core layer on the first cladding layer, and a step of forming a second cladding layer on the core layer.

According to a 44th aspect of the present invention based on the 40th, as the second substrate, use is made of a multilayer circuit board containing at least one type of inorganic material selected from the group comprising alumina ($Al_2O_3$), a glass ceramic, aluminum nitride (AlN), and mullite.

According to a 45th aspect of the present invention based on the 40th, as the second substrate, use is made of a multilayer circuit board containing at least one type of organic material selected from the group comprising a glass epoxy resin, a polyimide, BT resin, polyphenyl ether (PPE) resin, phenol resin, and polyolefin resin.

According to a 46th aspect of the present invention based on the 40th, the second substrate is comprised of a core substrate and a printed substrate formed on at least one surface of the core substrate and printed with electrical wiring patterns.

According to a 47th aspect of the present invention based on the 43rd, as the material for forming the first and second cladding layers, one is use having a refractive index of light smaller than that of the material forming the core layer.

According to a 48th aspect of the present invention based on the 43rd, as the material forming the first and second cladding layers, one is used including as a main ingredient at least one material selected from the group comprising a polyimide, epoxy resin, acryl resin, polyolefin resin, and synthetic rubber.

According to a 49th aspect of the present invention based on the 42nd, as the material forming the substrate separation layer, silicon dioxide ($SiO_2$) is used.

According to a 50th aspect of the present invention based on the 42nd, as the material forming the substrate separation layer, an etchable metal material is used.

According to a 51st aspect of the present invention based on the 42nd, the step of forming an inclined surface at least at one end of the optical waveguide path includes a step of coating the optical waveguide path with a photoresist and exposing and developing the photoresist so as to form a desired photoresist pattern, a step of inclining an edge region of the photoresist pattern, a step of using the photoresist pattern as a mask and anistropically etching the portion of the optical waveguide path exposed from the edge region of the photoresist pattern to make the end of the optical waveguide path a tapered inclined surface, and a step of removing the photoresist pattern.

According to a 52nd aspect of the present invention based on the 42nd, the step of forming an inclined surface at least at one end of the optical waveguide path includes a step of vapor depositing on the optical waveguide path a metal film, a step of coating the metal film with a photoresist and exposing and developing the photoresist so as to form a desired photoresist pattern, a step of using the photoresist pattern as a mask and etching the metal film to form a desired pattern, a step of using the metal film as a mask and irradiating a laser beam on a predetermined region of the optical waveguide path from a predetermined angle to cut the optical waveguide path, and a step of removing the metal film by etching and cleaning the processed product as a whole.

According to a 53rd aspect of the present invention based on the 42nd, the step of forming an inclined surface at least at one end of the optical waveguide path includes a step of heating a heat tool having an inclined surface at its tip and pressing the tip of the heat tool into the optical waveguide path so as to form the inclined surface in the optical waveguide path and a step of removing the heat tool and then polishing off scum produced at the melted portion of the optical waveguide path.

According to a 54th aspect of the present invention based on the 42nd, the step of forming an inclined surface at least at one end of the optical waveguide path includes a step of cutting the first substrate at a predetermined angle and a step of polishing an end surface formed by the cutting of the first substrate so as to form the end surface of the optical waveguide path into an inclined surface.

According to a 55th aspect of the present invention based on the 40th, as the first substrate, use is made of a substrate comprised of a light transmitting material able to pass light and the step of securing the second substrate to the optical waveguide path includes a step of forming at a predetermined position on the second substrate a bonding layer comprised of a photo-curing resin which cures by irradiation of light, a step of bringing the bonding layer of the second substrate into close contact with the optical waveguide path formed on the first substrate, and a step of irradiating light from the back of the first substrate toward the second substrate to cure the bonding layer.

According to a 56th aspect of the present invention based on the 40th, the step of securing the second substrate to the optical waveguide path includes a step of forming at a predetermined position on the second substrate a bonding layer comprised of a heat-curing resin, a step of bringing the bonding layer of the second substrate into close contact with the optical waveguide path formed on the first substrate, and a step of heating the first substrate and the second substrate as a whole to cure the bonding layer.

According to a 57th aspect of the present invention based on the 42nd, in the step of removing the first substrate to transfer the optical waveguide path to the second substrate, a solvent is supplied between the bonded first substrate and second substrate to remove the substrate separation layer and then the first substrate is separated from the optical waveguide path.

According to a 58th aspect of the present invention based on the 42nd, in the step of removing the first substrate to transfer the optical waveguide path to the second substrate, a solvent is supplied between the bonded first substrate and second substrate to separate the boundary between the substrate separation layer and the optical waveguide path.

According to a 59th aspect of the present invention based on the 40th, the at least one of the light emitting element and light receiving element and the integrated circuit have connection electrodes and in the step of forming the at least one of the light emitting element and light receiving element and the step of forming the integrated circuit, the at least one of the light emitting element and light receiving element and the integrated circuit are mounted on the second substrate by flip chip bonding using the connection electrodes.

According to a 60th aspect of the present invention based on the 59th, in the step of forming the at least one of the light emitting element and light receiving element and the step of forming the integrated circuit, the optical waveguide path is used as a spacer interposed between the at least one of the light emitting element and light receiving element and the integrated circuit and the second substrate According to a 61st aspect of the present invention based on the 59th, spherical portions formed on tips of fine gold wires are pressed against electrodes of the at least one of the light emitting element and light receiving element and the integrated circuit, then the spherical portions and the fine gold wires are pulled apart to cut them and thereby form the connection electrodes.

In short, in the optical waveguide according to the present invention, therefore, an optical waveguide path formed separately in advance is arranged on the substrate and then a light signal is propagated inside this optical waveguide path.

Further, in the method for producing the optical waveguide according to the present invention, therefore, an optical waveguide path formed using a first substrate as a supporting base is secured together with a second substrate and then the first substrate is removed to transfer the optical waveguide path to the second substrate.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Figure 1:
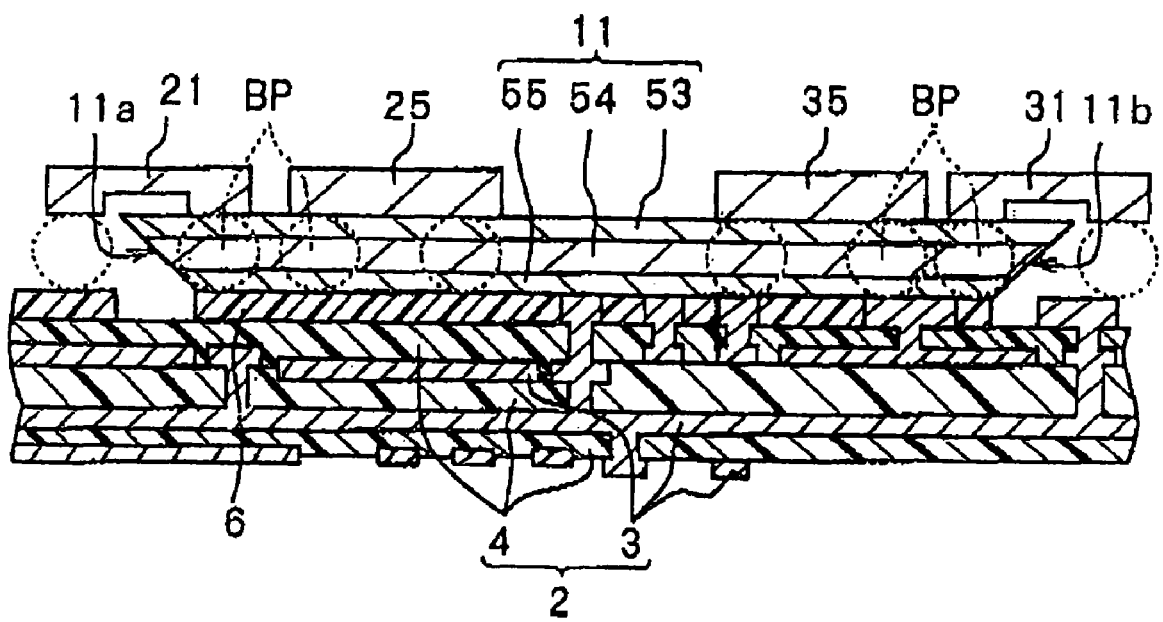
FIG. 1 is a sectional view of the configuration of an optical waveguide according to a first embodiment of the present invention.

Below, preferred embodiments of the present invention will be explained in detail by referring to the drawings.

First Embodiment

First, an explanation will be made of the configuration of an optical waveguide according to a first embodiment of the present invention with reference to FIG. 1.

FIG. 1 is a view showing the sectional configuration of an optical waveguide 1 according to the present embodiment. This optical waveguide 1 is provided with a multilayer circuit board 2, an optical waveguide path 11 bonded to the multilayer circuit board 2 via a bonding layer 6, a light receiving element 21 mounted on the multilayer circuit board 2 over the optical waveguide path 11 as a spacer, IC chips 25 and 35, and a light emitting element 31. Here, the multilayer circuit board 2 corresponds to a concrete example of the "substrate" and "second substrate" of the present invention. Further, the IC chips 25 and 35 correspond to concrete examples of the "integrated circuit" of the present invention.

The multilayer circuit board 2 is an electric circuit substrate comprised of a plurality of electrical wiring 3 stacked via insulators 4. The electrical wiring 3 have the function of supplying electric power to the IC chips 25 and 35, light receiving element 21, and light emitting element 31, and the function of transferring for example low speed control signals with the IC chips 25 and 35, the light receiving element 21, and the light emitting element 31 and transferring signals with the outside. Namely, the electrical wiring 3 are mounting use pattern wiring for mounting the light receiving element 21, light emitting element 31, and IC chips 25 and 35 on the multilayer circuit board 2. Specifically, various power supply wiring patterns, including ground lines, for supplying electric power to the light receiving element 21, light emitting element 31, and IC chips 25 and 35, wiring for connecting the IC chips 25 and 35 and the light receiving element 21 and the light emitting element 31, including wiring for supplying control use signals, etc. are formed.

As the multilayer circuit board 2, use is made of for example a ceramic multilayer circuit board in which the insulator 4 is made of alumina ($Al_2O_3$), a low temperature sintered glass ceramic, glass ceramic, aluminum nitride (AlN), mullite, or another inorganic material. Further, use is sometimes made of a glass epoxy multilayer circuit board in which the insulator 4 is made of FR-4 or another glass epoxy resin, a so-called "build up" multilayer circuit board enabling high density pattern formation on a usual glass epoxy circuit board by photolithography using for example a photosensitive epoxy resin, a flexible multilayer circuit board in which a polyimide film or the like is used as the insulator 4, or a multilayer circuit board using an organic material such as a BT resin, PPE (polyphenyl ether) resin, phenol resin, or polyolefin resin (for example Teflon® made by Dupont). Other than this, it is also possible to use a printed circuit board comprised of a core substrate made of for example a dielectric material on which is arranged a printed board on which electrical wiring patterns are printed at a high density.

The bonding layer 6 is interposed between the optical waveguide path 11 and the multilayer circuit board 2 and is constituted by for example a glass epoxy resin or other photo-curing resin or heat curing resin, Further, the thickness thereof is for example about 10 μm. This bonding layer 6 also serves to flatten the unevenness of the surface of the multilayer circuit board 2 in addition to its role of bonding the optical waveguide path 11 and the multilayer circuit board 2.

The optical waveguide path 11 is constituted by for example a core layer 54, an upper cladding layer 53, and a lower cladding layer 55 formed so as to surround the core layer 54. This optical waveguide path 11 has inclined surfaces 11a and 11b giving sharp, for example, approximately 45°, outer angles with the surface of the multilayer circuit board 2 at for example both end portions. Note that an outer angle of the optical waveguide path 11 formed with the surface of the multilayer circuit board 2 means the outer angle of the closed shape formed by the cross-section of the optical waveguide path 11 along the direction of light propagation. Here, the upper cladding layer 53 corresponds to a concrete example of the "first cladding layer" of the present invention, while the lower cladding layer 55 corresponds to a concrete example of the "second cladding layer" of the present invention. Further, the inclined surfaces 11a and 11b correspond to concrete examples of the "light reflection portion" of the present invention.

The inclined surfaces 11a and 11b give outer angles together with the surface of the multilayer circuit board 2 of approximately 45° as mentioned above and function to reflect a light signal striking them in a direction orthogonal to the main surface of the multilayer circuit board 2 from the outside of the optical waveguide path 11 so as to introduce it into the optical waveguide path 11 and, at the same time, reflect a light signal propagated in the optical waveguide path 11 so as to guide it to a direction orthogonal to the main surface of the multilayer circuit board 2.

The upper cladding layer 53 and the lower cladding layer 55 are constituted by an epoxy resin comprised mainly of bisphenol having a refractive index of for example about 1.52 and has a thickness of for example 20 μm. Further, the core layer 54 is constituted by a material having a larger refractive index than that of the material constituting the upper cladding layer 53 and the lower cladding layer 55, for example, an epoxy resin having a refractive index of about 1.54. The thickness of the core layer 54 is for example 20 μm, while the width is for example 60 μm. Note that the upper cladding layer 53, core layer 54, and lower cladding layer 55 can be constituted by other materials too, for example, a polyimide, polymethyl methacrylate (PMMA), or other acrylic resin, polyethylene, polystyrene, or other polyolefin resin, or synthetic rubber so far as they satisfy the condition that the refractive index of the core layer 54 be larger than the refractive index of the upper cladding layer 53 and the lower cladding layer 55.

The light receiving element 21 converts the light signal striking its incident surface from the optical waveguide path to an electrical signal which it then outputs to the electrical wiring 3 formed on the multilayer circuit board 2. A photodiode can be mentioned as an example thereof. Here, the incident surface of the light receiving element 21 is provided at a position facing the inclined surface 11a of the optical waveguide path 11 so as to be orthogonal to the main surface of the multilayer circuit board 2.

The light emitting element 31 converts an electrical signal input to the light emitting element 31 through the electric wiring 3 of the multilayer circuit board 2 to a light signal which it then emits to the inclined surface 11b of the optical waveguide path 11. A light emitting diode (LED) can be mentioned as an example thereof. Note that the light emitting surface of the light emitting element 31 is provided at a position facing the inclined surface 11b of the optical waveguide path 11 so as to be orthogonal to the main surface of the multilayer circuit board 2.

In the IC chips 25 and 35, for example, signal processing circuits, memory circuits, and other electronic circuits are integrated. Electric power is supplied through the electrical wiring 3 of the multilayer circuit board 2. Further, these IC chips 25 and 35 are electrically connected to the light receiving element 21 and the light emitting element 31 by the electric wiring 3 and function to transferring electrical signals between the light receiving element 21 and the light emitting element 31.

The light receiving element 21, light emitting element 31, and IC chips 25 and 35 are provided with for example electrode pads (not illustrated). These electrode pads contact ball bumps (projections) BP made of for example a solder (Pb—Sn solder) containing as principal components lead (Pb) and tin (Sn). Namely, the light receiving element 21 and light emitting element 31 and the IC chips 25 and 35 are arranged sandwiching the optical waveguide path 11 therebetween and, at the same time, electrically connected to the electric wiring 3 on the multilayer circuit board 2 by the bumps BP. The bumps BP correspond to concrete examples of the "connection electrode" of the present invention. Note that, as the bumps BP, use can be also made of ball bumps made of gold (Au) or ones obtained by coating a solder on spherical bodies (ball cores) having electric conductivity such as copper (Cu).

Next, an explanation will be made of the mode of operation of this optical waveguide 1.

In this optical waveguide 1, the electric power supplied from for example the electric wiring 3 of the multilayer circuit board 2 places the light receiving element 21, light emitting element 31, and IC chips 25 and 35 in an operation ready state. In this state, when an electrical signal is output from the IC chip 35 to the light emitting element 31, the light emitting element 31 converts the electrical signal to a light signal which it then emits from the emitting surface. The emitted light signal strikes the inclined surface 11b where it is reflected and then introduced into the optical waveguide path 11. This light signal is then propagated in the optical waveguide path 11 and reflected at the inclined surface 11a to strike the incident surface of the light receiving element 21. The light signal striking the light receiving element 21 is converted to an electrical signal which is input to the IC chip 25. In this way, the light signal is transmitted at a high speed between the IC chip 35 and the IC chip 25. Further, a low speed control signal or other signal which can be transmitted at a relatively low speed is transmitted as an electrical signal as it is by the electrical wiring 3 of the multilayer circuit board 2. Here, the transmission rate of the light signal corresponds to a concrete example of the "first rate" of the present invention, while the transmission rate of the electrical signal corresponds to a concrete example of the "second rate" of the present invention.

In this way, in the optical waveguide according to the present embodiment, electric power can be supplied to the IC chips 25 and 35, the light receiving element 21, and the light emitting element 31 and the signals which control the IC chip 35 and the IC chip 25 and can be transmitted at a relatively low speed can be transmitted by the electric wiring 3 of the multilayer circuit board 2, while signals which must be transmitted between the IC chip 35 and the IC chip 25 at a high speed can be transmitted as light signals by the light emitting element 31, the optical waveguide path 11, and the light receiving element 21. Accordingly, the disadvantage of the delay of the signal due to the CR time constant of the electric wiring 3 can be solved. Further, it is also possible to solve the problem of the electromagnetic radiation noise and the disadvantage of malfunctions due to the disturbances in the waveform.

Further, in the optical waveguide according to the present embodiment, the IC chips 25 and 35, the light receiving element 21, and the light emitting element 31 are mounted on the multilayer circuit board 2 through the optical waveguide path 11 and the bumps BP, so the optical waveguide path 11 supports the IC chips 25 and 35, the light receiving element 21, and the light emitting element 31, and functions as a spacer for securing a space for arranging the bumps BP. For this reason, the IC chips 25 and 35, the light receiving element 21, and the light emitting element 31 can be stably secured to the multilayer circuit board 2. Further, the optical waveguide path 11 enables the distance between the IC chips 25 and 35, the light receiving element 21, and the light emitting element 31 and the electric wiring 3 to be maintained at a predetermined value.

Figure 2:
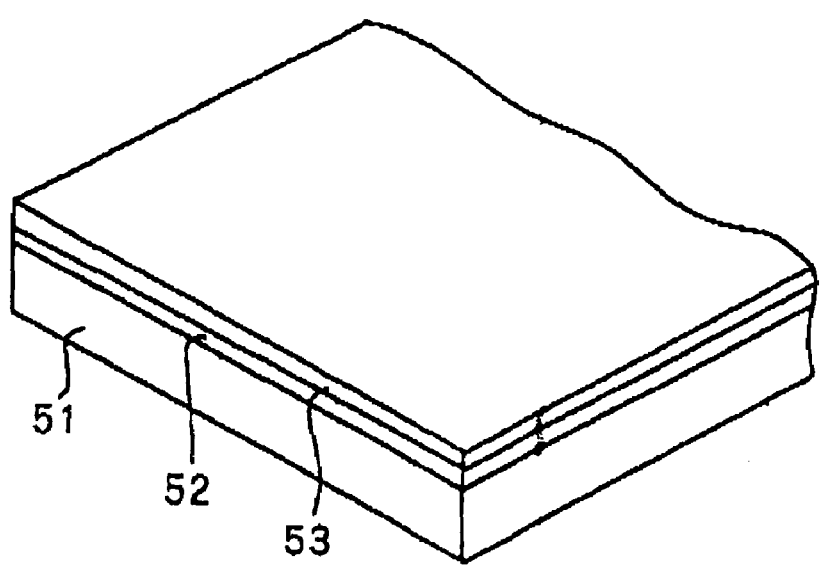
FIG. 2 is a perspective view for explaining a step of production of the optical waveguide according to the first embodiment of the present invention.
Figure 3:
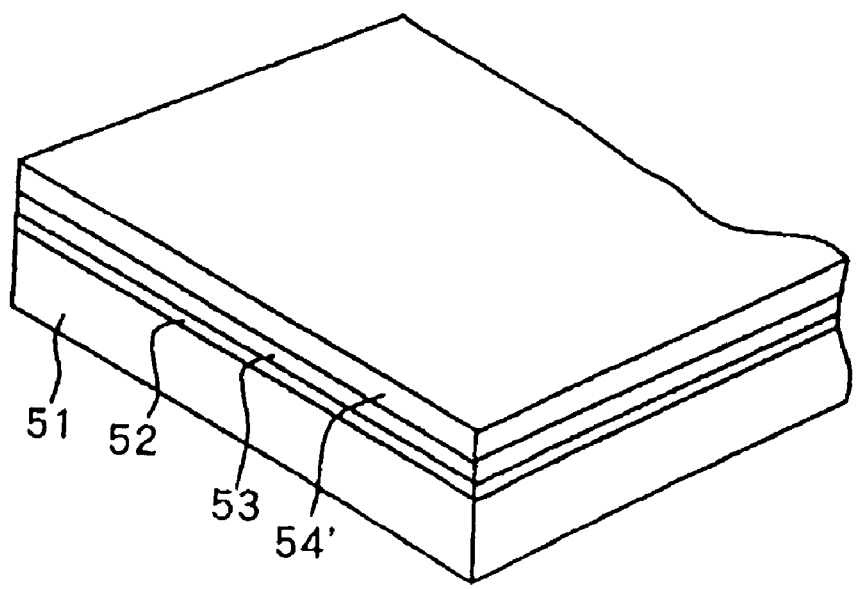
FIG. 3 is a perspective view for explaining a step of production following FIG. 2.
Figure 4:
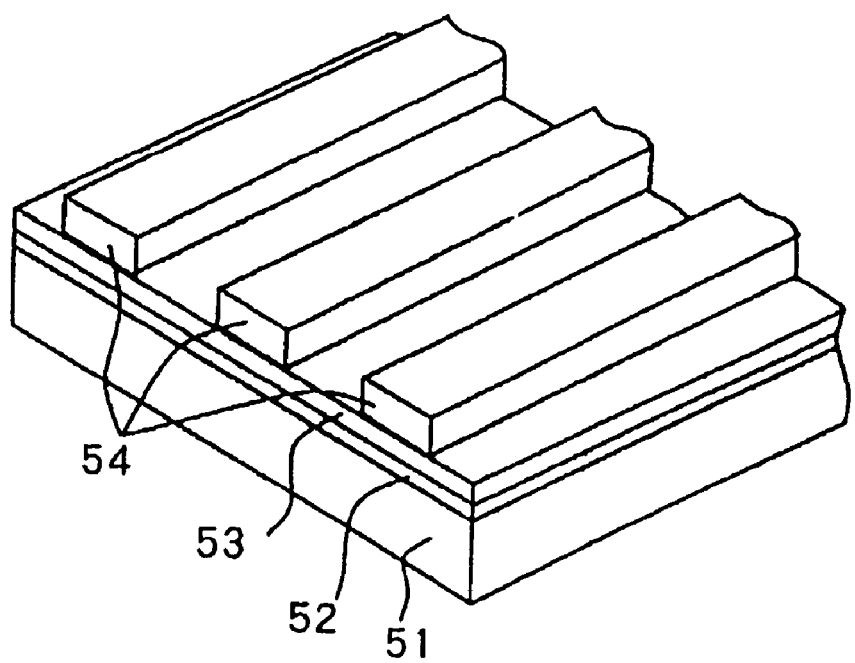
FIG. 4 is a perspective view for explaining a step of production following FIG. 3.
Figure 5A:
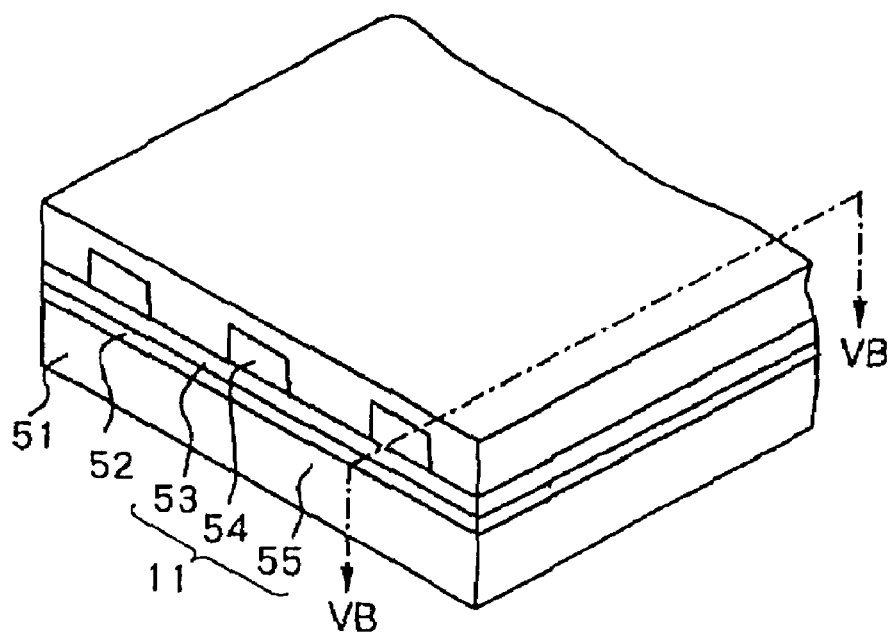
FIG. 5A is a partially cutaway perspective view for explaining a step of production following FIG. 4.
Figure 5B:
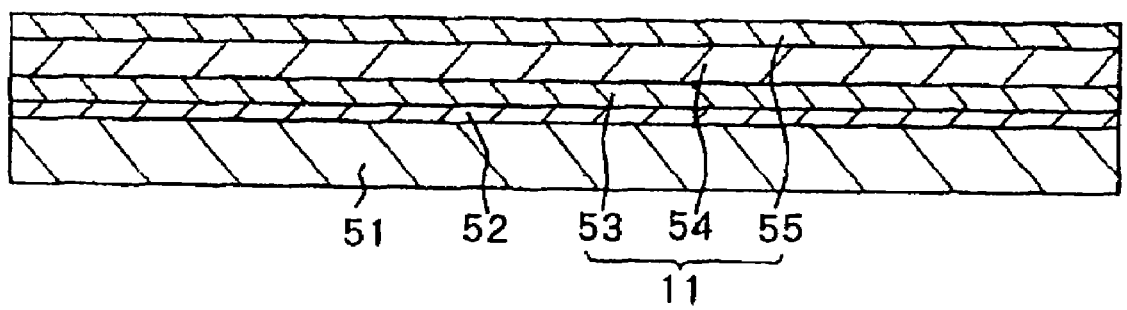
FIG. 5B is a sectional view taken along a line VB-VB of FIG. 5A.
Figure 6:
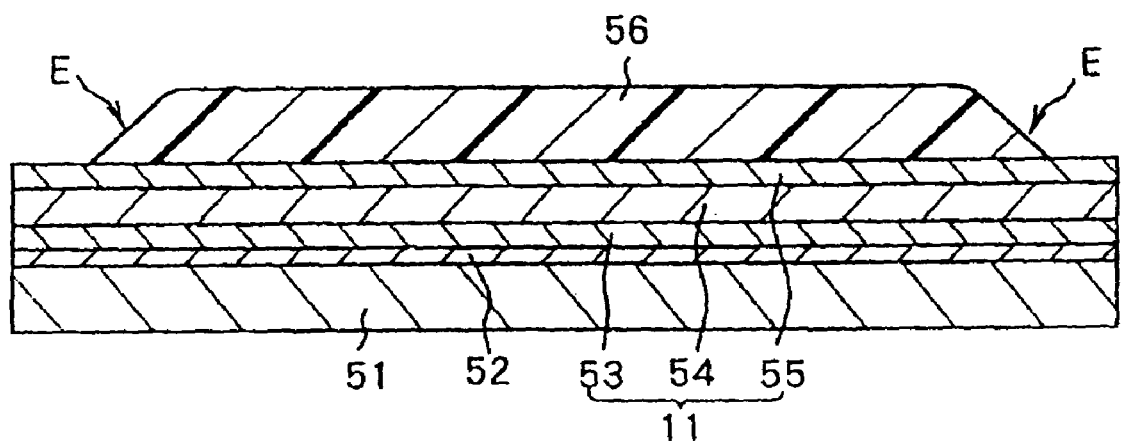
FIG. 6 is a sectional view for explaining a step of production following FIGS. 5A and 5B.
Figure 7:
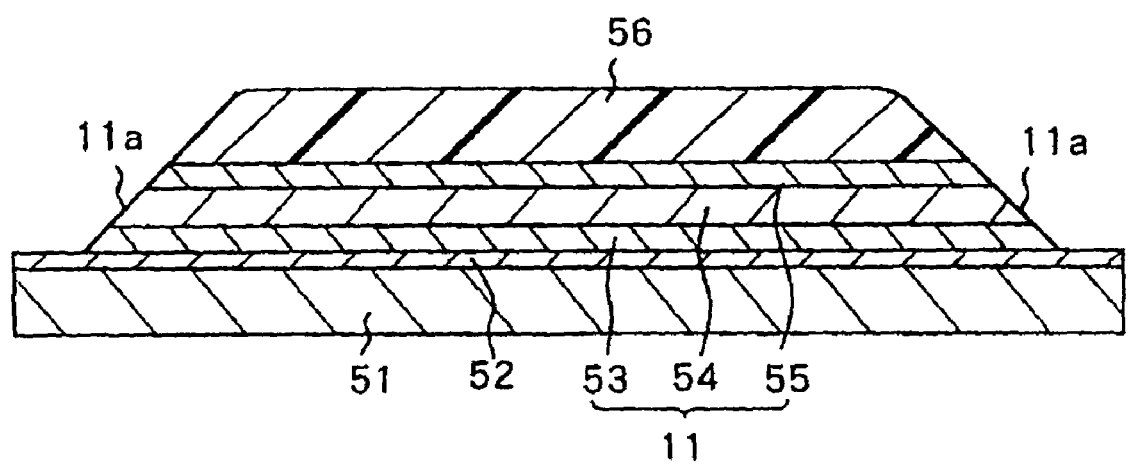
FIG. 7 is a sectional view for explaining a step of production following FIG. 6.
Figure 8A:
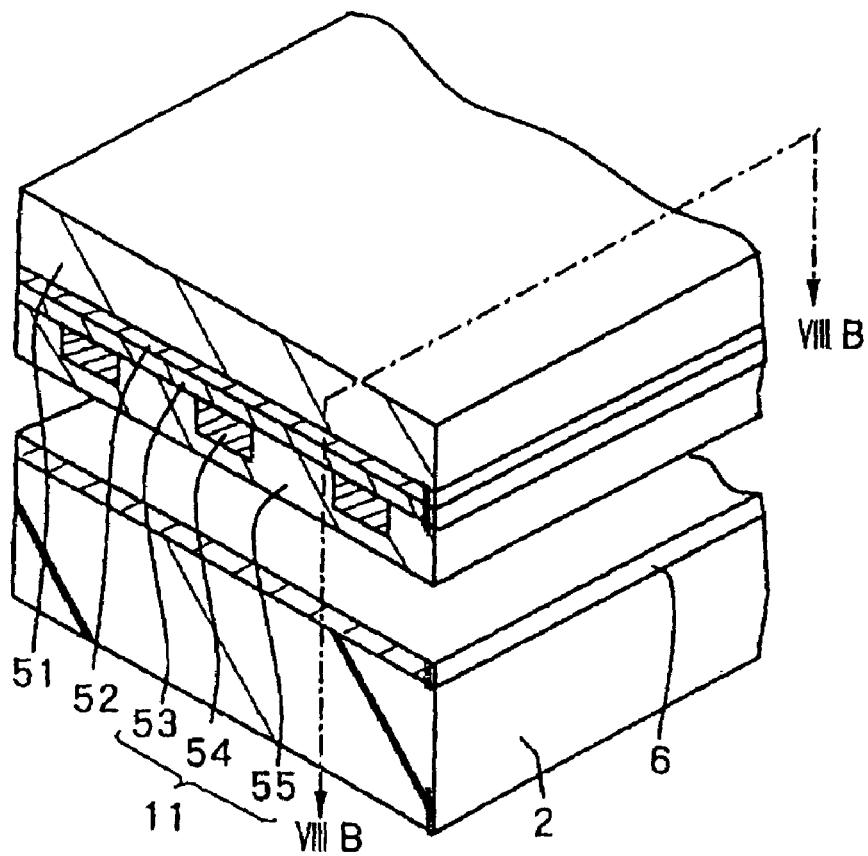
FIG. 8A is a partially cutaway perspective view for explaining a step of production following FIG. 7.
Figure 8B:
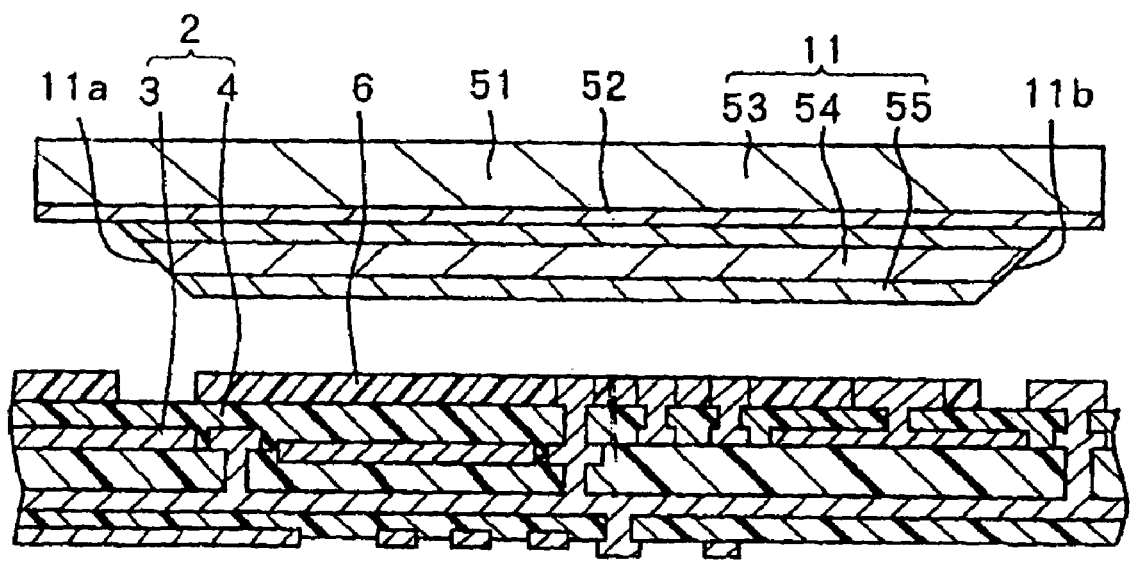
FIG. 8B is a sectional view taken along a line VIIIB-VIIIB of FIG. 8A.
Figure 9A:
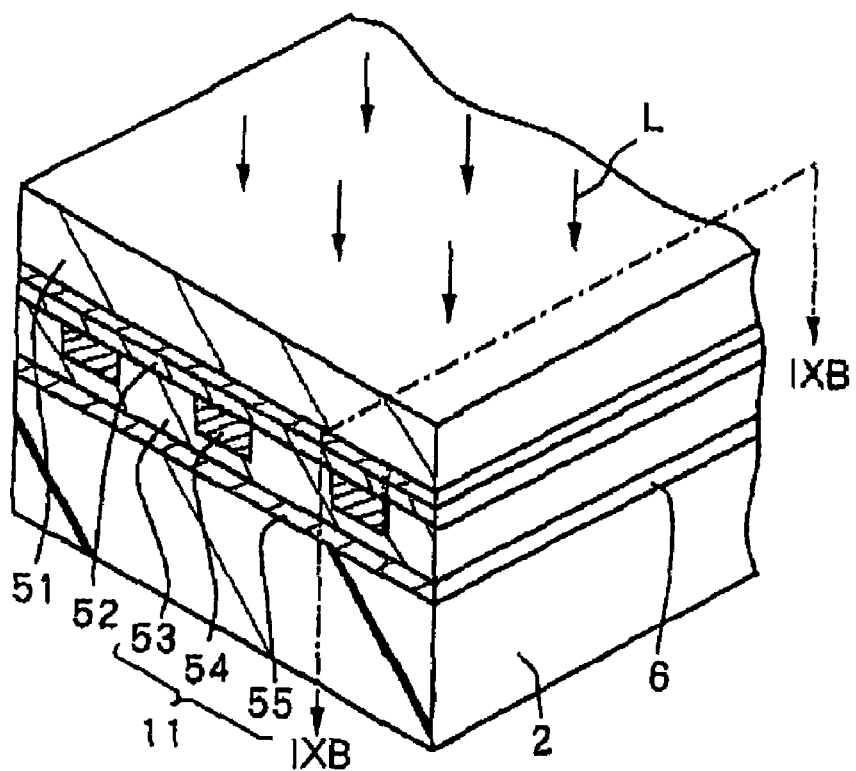
FIG. 9A is a partially cutaway perspective view for explaining a step of production following FIGS. 8A and 8B.
Figure 9B:
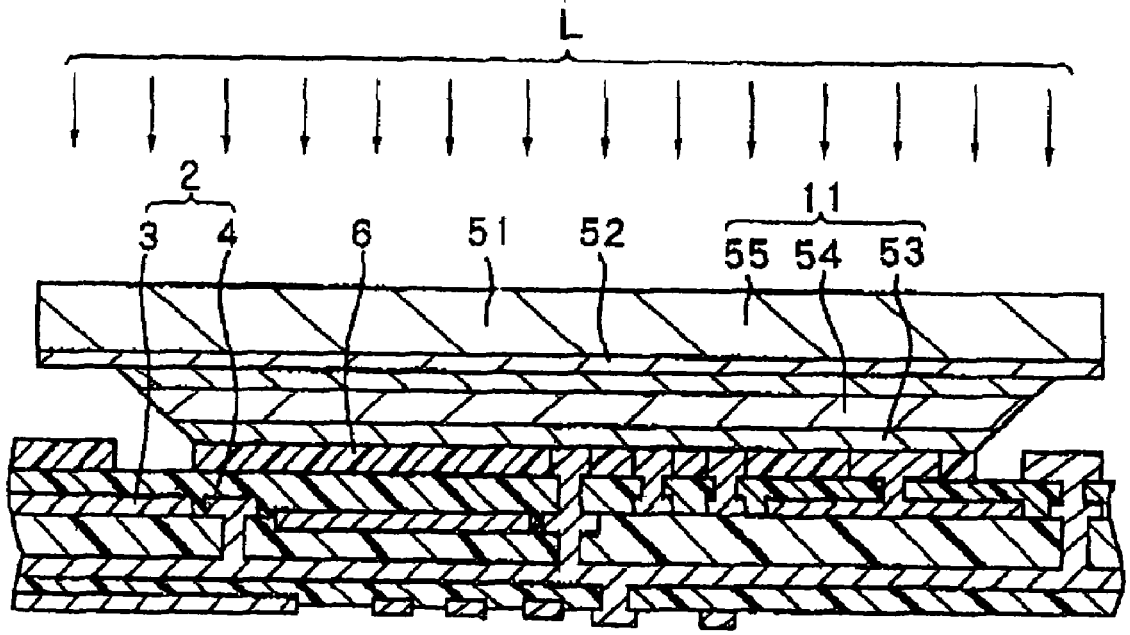
FIG. 9B is a sectional view taken along a line IXB-IXB of FIG. 9A.
Figure 11A:
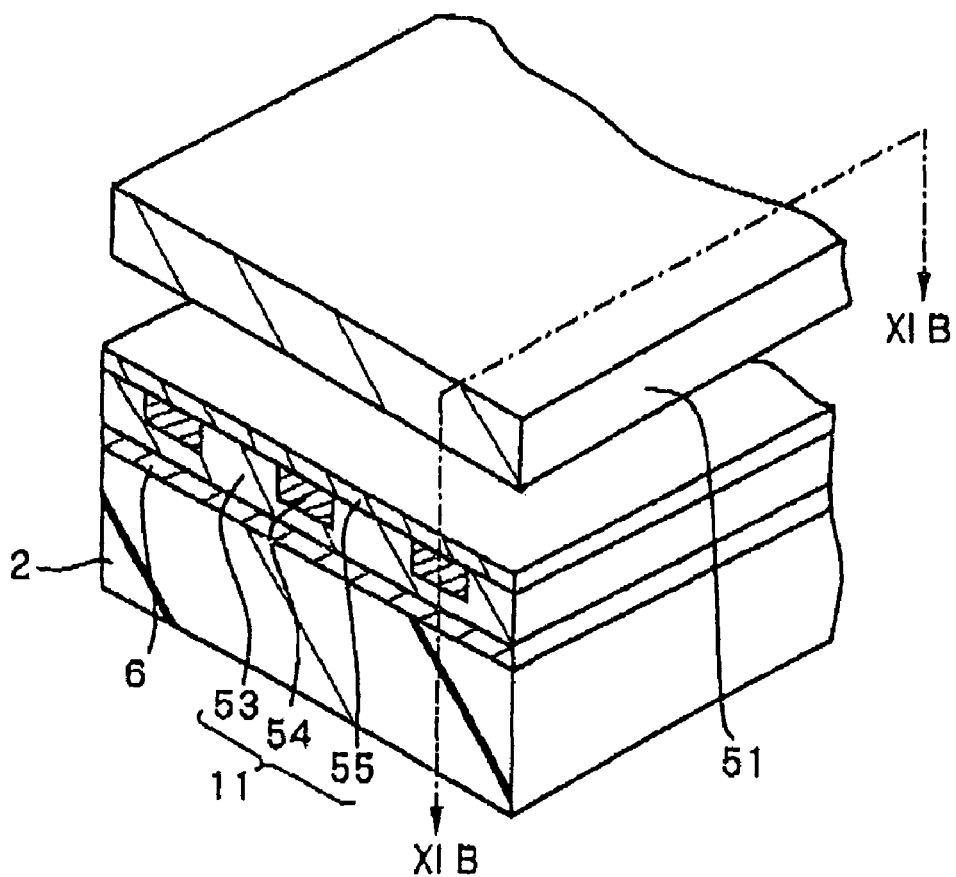
FIG. 11A is a partially cutaway perspective view for explaining a step of production following FIGS. 9A and 9B.
Figure 11B:
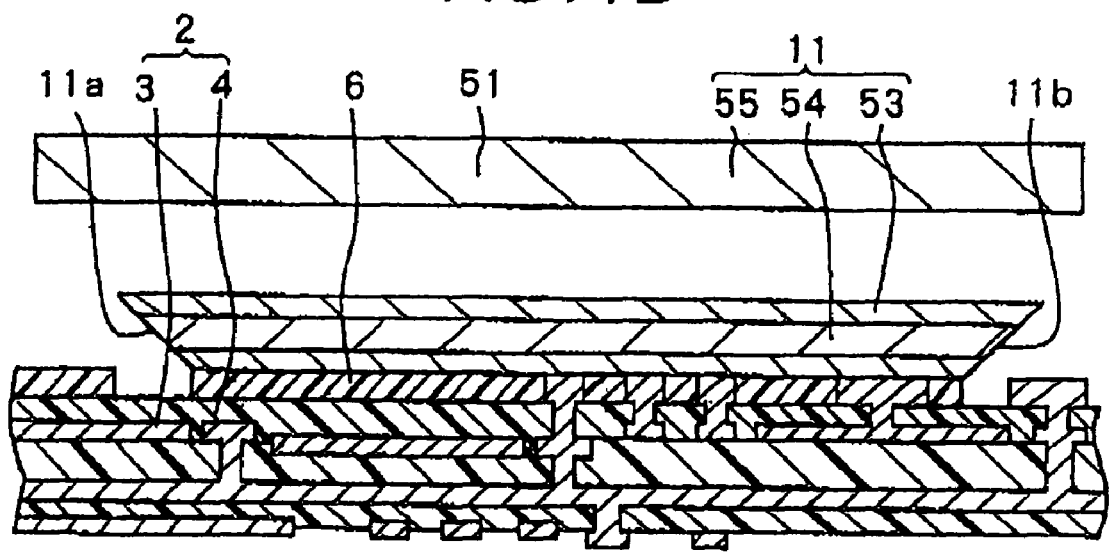
FIG. 11B is a sectional view taken along a line XIB-XIB of FIG. 11A.
Figure 12:
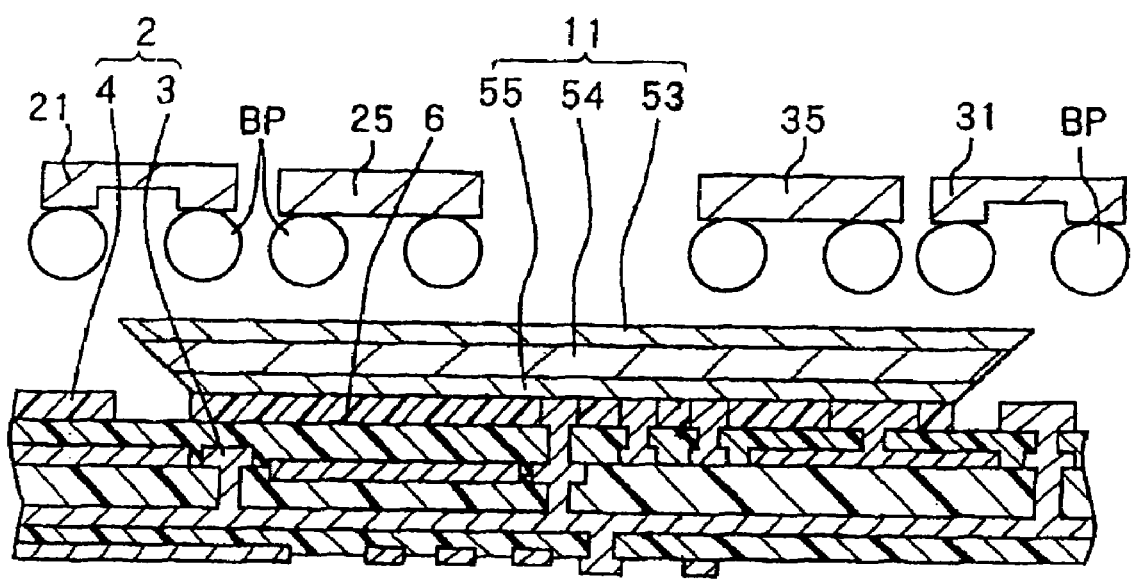
FIG. 12 is a sectional view for explaining a step of production following FIG. 6.

Next, an explanation will be made of the method for producing the optical waveguide according to the present embodiment by referring to FIG. 2 through FIG. 12. Note that FIG. 2 through FIG. 4 are perspective views each representing one step of production. FIG. 5A is a perspective view of a step of production, while FIG. 5B shows the sectional structure along a line VB-VB of FIG. 5A. FIG. 6, FIG. 7, and FIG. 12 are sectional views each representing one step of production. FIGS. 8A, 9A, and 11A are partially cutaway perspective views each representing one step of production, while FIGS. 8B, 9B, and 11B show the sectional structure taken along the lines VIIIB-VIIIB, IXB-IXB, and XIB-XIB, respectively.

First, as shown in FIG. 2, a transparent substrate 51 excellent in flatness made of for example quartz glass, lead glass, soda glass, or mica or another material transmitting light in a range from the ultraviolet zone to visible zone relatively well (light transmitting material) is prepared. A substrate separation (isolation) layer 52 made for example of silicon dioxide ($SiO_2$) having a thickness of 500 nm is formed on this transparent substrate 51 by for example plasma chemical vapor deposition (CVD) thermal CVD, optical CVD, or another process. This substrate separation layer 52 is for separating the transparent substrate 51 from the optical waveguide path 11. Details thereof will be mentioned later. Note that silicon dioxide is a substantially transparent material with respect to light in the range from the ultraviolet zone to the visible zone. Next, an epoxy resin is coated on the substrate separation layer 52 to give a thickness of about 20 μm by for example spin coating, then heat treatment is carried out to cause the resin to solidify and thereby form an upper cladding layer 53 having a refractive index of for example 1.52.

Next, as shown in FIG. 3, a method similar to the method for formation of for example the upper cladding layer 53 and a material having a higher refractive index than that of the material constituting the upper cladding layer 53 (for example epoxy resin) are used to form a core layer 54' which has for example a refractive index of 1.54 and thickness of about 30 μm on the upper cladding layer 53.

Next, as shown in FIG. 4, a photoresist film (not illustrated) having a predetermined pattern is formed, then, for example, RIE is carried out by using this photoresist film as a mask. By this, the core layer 54' becomes a plurality of stripes of core layers 54 spaced from each other.

Next, as shown in FIGS. 5A and 5B, a method similar to the method for forming the upper cladding layer 53 and an identical material to that for the upper cladding layer 53 are used to form a lower cladding layer 55 having a thickness of about 20 μm on the entire surface of the transparent substrate 51.

Note that the upper cladding layer 53, core layer 54, and the lower cladding layer 55 may also be formed by coating a photo-curing resin on the respective underlying layers and then curing the resin by irradiating this photo-curing resin with light.

Next, as shown in FIG. 6, a photoresist film 56 having for example a thickness of about several tens of Am is formed on the lower cladding layer 55. Next, a predetermined exposure processing and development processing are applied to the photoresist film 56 to process the photoresist film 56 to a predetermined pattern, then this patterned photoresist film 56 is heat treated at a temperature more than for example the glass transition temperature. As a result, an edge part of the photoresist film 56 becomes fluid and the inclined surfaces (E portions of FIG. 6) are formed.

Next, as shown in FIG. 7, the optical waveguide path 11 is anisotropically etched by using for example an RIE system or electro-cyclotron resonance (ECR) system with the photoresist film 56 as a mask. By this, both end portions of the optical waveguide path 11 are formed with shapes corresponding to the inclined surfaces of the photoresist film 56, that is, inclined surfaces 11a and 11b giving outer angles with the surface of the transparent substrate 51 of approximately 135°. Thereafter, the photoresist film 56 is removed.

Next, as shown in FIGS. 8A and 8B, for example, a multilayer circuit board 2 is prepared. The desired region of this multilayer circuit board 2 is formed with a bonding layer 6 having a thickness of about 10 μm made of a glass epoxy resin or other photo-curing resin by for example spin coating, dip coating, spraying, printing, or another process.

Next, as shown in FIG. 9, the transparent substrate 51 on which the optical waveguide path 11 is formed is turned upside down, and the optical waveguide path 11 is positioned with and pressed against the multilayer circuit board 2 on which the bonding layer 6 is formed. Then, in a state where the transparent substrate 51 side of the optical waveguide path 11 is pressed against the multilayer circuit board 2, light L is irradiated from the transparent substrate 51 side toward the multilayer circuit board 2 side. By this, the photo-curing resin constituting the bonding layer 6 cures and the multilayer circuit board 2 is secured to the desired position of the optical waveguide path 11. If a large amount of light L is irradiated for a short time, distortion will be created in the optical waveguide path 11 and the light propagation loss will end up becoming large. Therefore, a relatively small amount of the light L is irradiated over a long time. For example, when using an extra-high pressure mercury lamp (wavelength: center of g-rays (436 nm)) is used, light is irradiated for 5 minutes with an output of 10 mW/cm$^2$.

Figure 10:
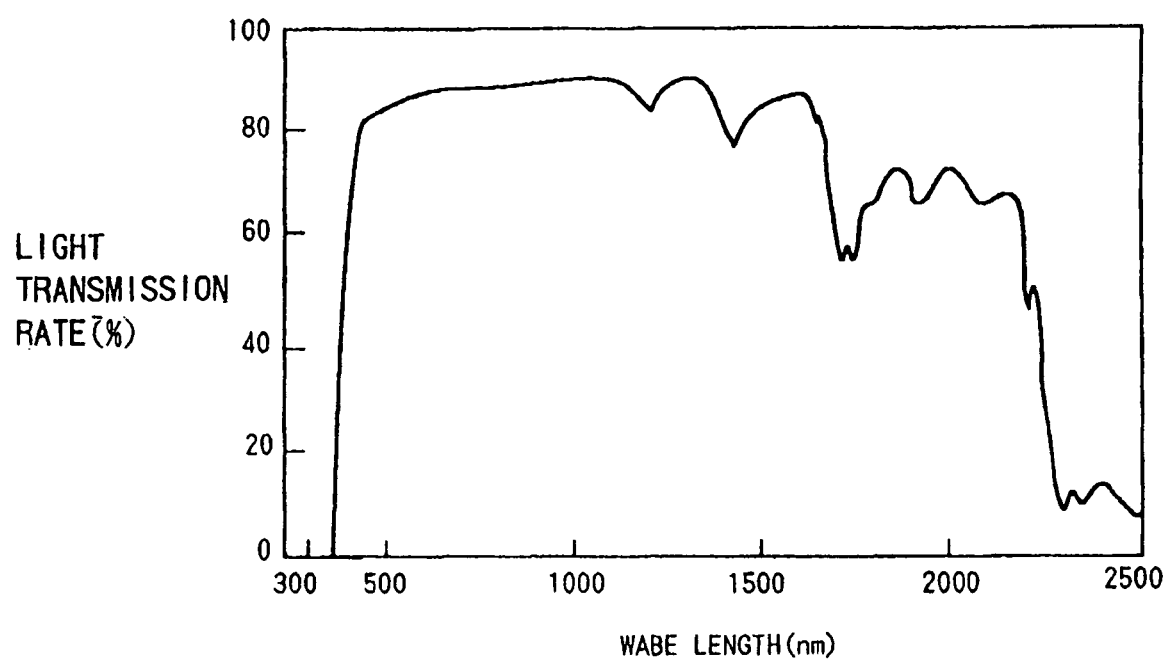
FIG. 10 is a graph of the relationship between the light transmission rate of an epoxy resin used in the first embodiment of the present invention and the wavelength of the light.

FIG. 10 is a graph showing the light transmission rate of the epoxy resin (thickness: 1 mm) used as the core layer 54, upper cladding layer 53, and the lower cladding layer 55 in the present embodiment. The ordinate indicates the light transmission rate (unit: %), while the abscissa indicates the wavelength of the light (unit: nm). As seen also from FIG. 10, this epoxy resin is a light transmitting resin which allows the light in the near ultraviolet zone and visible zone having a longer wavelength than about 350 nm to pass therethrough at a rate of about 90%. Further, as described above, the transparent substrate 51 and the substrate separation layer 52 have a sufficient transparency from the ultraviolet zone to the visible zone. Accordingly the light L emitted from for example the extra-high pressure mercury lamp passes through the transparent substrate 51, substrate separation layer 52, and the optical waveguide path 11 and sufficiently reaches the bonding layer 6, whereby the bonding layer 6 made of for example glass epoxy resin is completely cured.

Next, in the state where the multilayer circuit board 2 is secured to the optical waveguide path 11, the transparent substrate 51 and the multilayer circuit board 2 are dipped in for example a dilute hydrofluoric acid (HF) solution or a buffered hydrofluoric acid (BHF) solution. Due to this, as shown in FIGS. 11A and 11B, the substrate separation layer 52 formed between the transparent substrate 51 and the optical waveguide path 11 is dissolved and removed, and the state where the transparent substrate 51 on the substrate separation layer 52 is separated from the optical waveguide path 11 (lifted off) is exhibited, whereby the optical waveguide path 11 is transferred to the multilayer circuit board 2. Thereafter, the multilayer circuit board 2 to which the optical waveguide path 11 is transferred is pre-washed by water, washed, and dried.

Next, as shown in FIG. 12, the bumps BP are formed on the not illustrated electrode pads of the light emitting element 31, the IC chips 25 and 35, and the light receiving element 21. Specifically, for example, spherical portions made of gold formed at the tips of fine gold wires are pressed against the electrode pads of the light receiving element 21, light emitting element 31, and the IC chips 25 and 35, then the fine wires are pulled away from the spherical portions to cut the spherical portions from the fine wires and form the bumps BP. Thereafter, the light receiving element 21, light emitting element 31, and the IC chips 25 and 35 are mounted on the multilayer circuit board 2 by flip chip bonding and reflow is performed to an extent not damaging the optical waveguide path 11. Here, flip chip bonding means the process of positioning the bumps BP closely against the electrodes (wiring) facing the bumps BP provided on the multilayer circuit board 2 and applying heat and pressure to bond them. Note that it is also possible to perform the reflow by mounting the light receiving element 21 etc. after applying solder paste to the desired positions on the multilayer circuit board 2 without use of flip chip bonding by for example by printing. Further, it is also possible to mount for example chip type resistors, capacitors, inductors, and other elements besides the light receiving element 21, light emitting element 31, and the IC chips 25 and 35.

Finally, although not illustrated, a sealing resin (for example epoxy resin) is introduced between the mounted light receiving element 21, light emitting element 31,.and the IC chips 25 and 35 and the multilayer circuit board 2 by utilizing for example the capillary action so as to seal the light receiving element 21, light emitting element 31, and the IC chips 25 and 35. By this, the reliably of the connection between the light receiving element 21, light emitting element 31, and the IC chips 25 and 35 with the electric wiring 3 is improved.

In this way, in the method for producing an optical waveguide according to the present embodiment, an optical waveguide path 11 is formed in advance on a transparent substrate 51 excellent in flatness and then transferred to the multilayer circuit board 2, therefore even in a case where a multilayer circuit board 2 having a large surface unevenness is used as the supporting base, it is possible to prepare an optical waveguide 1 having an optical waveguide path 11 having little light propagation loss.

Further, according to the present embodiment, a relatively low cost ceramic multilayer circuit board or printed circuit board is used as the multilayer circuit board 2 and parts such as the IC chips 25 and 35, the light receiving element 21, and the light emitting element 31 are mounted on this multilayer circuit board 2, therefore the parts can be easily mounted. Further, in comparison with the method of the related art of forming the electrical wiring layer on a silicon substrate by thin film technology and mounting the parts thereon, it is possible to inexpensively produce an optical waveguide 1 which can simultaneously transmit signals by light, transmit signals by electricity, and supply electric power.

Further, according to the present embodiment, the method is divided to a thin film process for forming the optical waveguide path 11 and a thick film process for forming the multilayer circuit board 2, and the optical waveguide path 11 formed by the thin film process is transferred to the multilayer circuit board 2, therefore there is no need to use spin coating, by which it is considered difficult to form a film on a substrate other than a disk-like substrate, and therefore the optical waveguide path 11 can be easily formed on a substrate of a polygonal or other shape. As a result, the degree of freedom of selection of the shape and the material etc. of the substrate serving as the supporting base of the optical waveguide path 11 (here the multilayer circuit board 2) is increased and the manufacturing cost can be reduced.

Further, when using the process of forming the optical waveguide path 11 in advance on the transparent substrate 51 separately from the multilayer circuit board 2 and transferring the optical waveguide path 11 as in the present embodiment and at the same time forming the sectional shape (particularly the width) of the optical waveguide path 11 large, the positioning of the IC chips 25 and 35, light emitting element 21, and the light receiving element 31 with respect to the optical waveguide path 11 becomes easy and it becomes possible to lower the manufacturing cost in this point as well.

Note that, in the present embodiment, the IC chips 25 and 35, light emitting element 21, and the light receiving element 31 were mounted in contact with the optical waveguide path 11 using the optical waveguide path 11 as a spacer, but as mentioned above, it is necessary to take care so as not to damage the optical waveguide path 11 when performing the reflow at the time of mounting. Accordingly, it is also possible to mount them so that the optical waveguide path 11 and the IC chips 25 and 35, light emitting element 21, and the light receiving element 31 are spaced from each other using the bumps BP as spacers. In this case, the bumps BP enable the distance between the IC chips 25 and 35, light emitting element 21, and the light receiving element 31 and the electric wiring 3 to be maintained at the predetermined value and, at the same time, enable electrical connection with a high reliability.

Second Embodiment

The second embodiment relates to a method for producing the optical waveguide. The optical waveguide covered by this method is similar to that of the first embodiment except for the point that the optical waveguide paths are spaced from each other. Below, an explanation will be made of the method for producing the optical waveguide of the present embodiment by referring to FIG. 1 through FIGS. 5A and 5B and FIG. 13 through FIG. 20. FIG. 13 through FIG. 20 are partially cutaway perspective views representing steps of production. Note that constituent elements the same as those of the first embodiment are given the same reference numerals and detailed explanations thereof are omitted.

In the method of production according to the present embodiment, first, in the same way as the steps of productions shown in FIG. 2 to FIGS. 5A to 5B of the first embodiment, the substrate separation layer 52 and the optical waveguide path 11 are formed on a transparent substrate 51.

Figure 13:
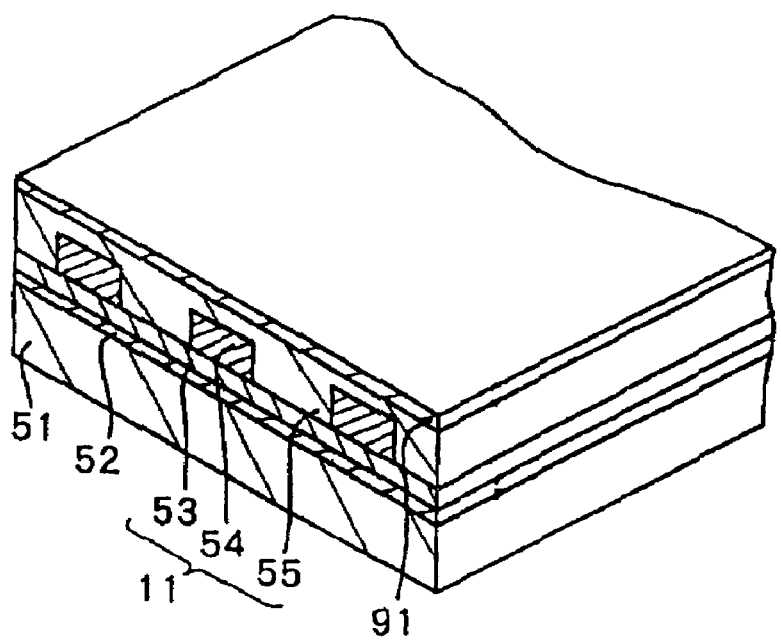
FIG. 13 is a partially cutaway perspective view for explaining a step of production of the optical waveguide according to a second embodiment of the present invention.

Next, as shown in FIG. 13, for example-plasma CVD, thermal CVD, optical CVD, or another process is used to form a peeling layer 91 made of silicon dioxide ($SiO_2$) having for example a thickness of 500 nm on the optical waveguide path 11. This peeling layer 91 is for selectively removing a light blocking film 92 mentioned later (refer to FIG. 15). Then, using photolithography in the same way as the first embodiment, both end portions of the optical waveguide path 11 are formed with inclined surfaces 11a and 11b (not illustrated here) giving an outer angle with the surface of the transparent substrate 51 of approximately 135°.

Figure 14:
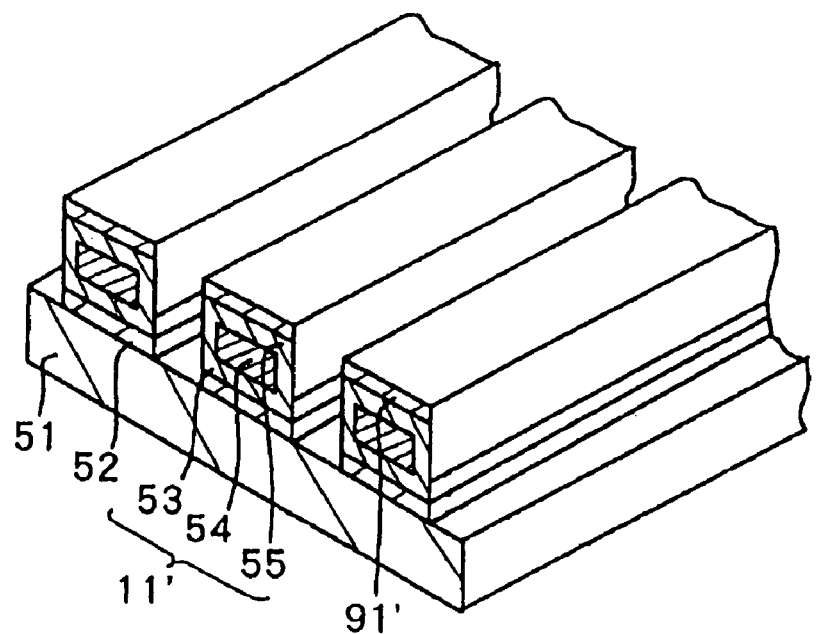
FIG. 14 is a partially cutaway perspective view for explaining a step of production following FIG. 13.

Next, as shown in FIG. 14, for example a not illustrated photoresist film having a predetermined pattern is formed. Using this photoresist film as a mask, laser processing or plasma etching using for example oxygen (O) plasma, ion beam etching, etching using powder (powder beam etching), or other etching is performed so as to selectively remove the peeling layer 91, optical waveguide path 11, and the substrate separation layer 52. Here, it is necessary to reliably remove them up to the lower surface of the optical waveguide path 11 (that is, the boundary of the upper cladding layer 53 and the substrate separation layer 52), therefore the laser-processing or etching must be carried out until the substrate separation layer 52 is exposed. By this, the optical waveguide path 11 and the peeling layer 91 formed on this are divided into a plurality of stripes of optical waveguide paths 11' and peeling layers 91' spaced from each other. Note that, where the part to be removed is a simple pattern constituted by straight lines, it can be removed by dicing or the like too.

Figure 15:
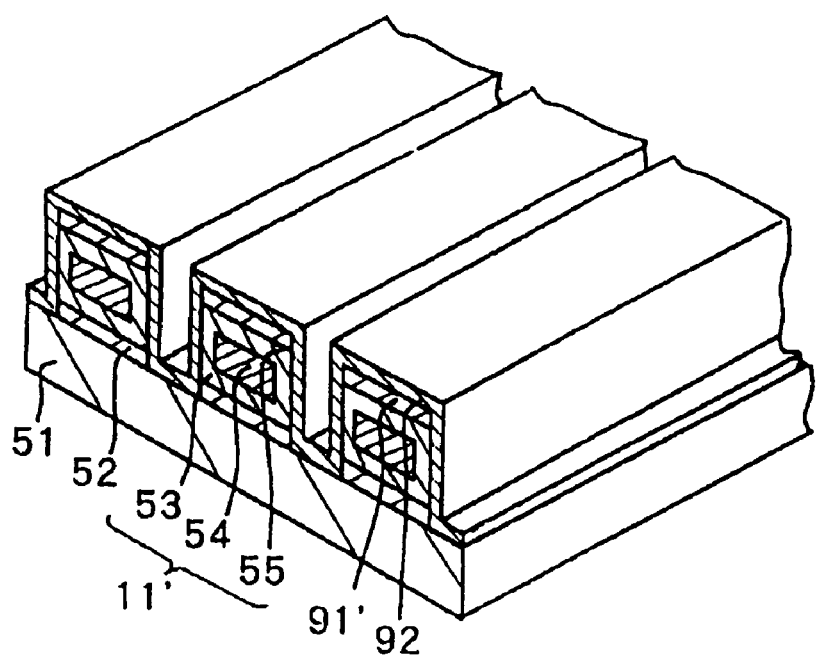
FIG. 15 is a partially cutaway perspective view for explaining a step of production following FIG. 14.

Next, as shown in FIG. 15, the light blocking film 92 made of chromium (Cr) of for example a thickness of 100 nm is formed on the entire exposed surfaces of the transparent substrate 51, optical waveguide path 11, and the peeling layer 91 by for example vapor deposition or sputtering. Note that the light blocking film 92 is for selectively blocking the light when exposing the bonding layer 6 mentioned later to cure it. Incidentally, as the material constituting the light blocking film 92, materials other than chromium can be used too so far as they are materials which can block light. Specifically use can be made of aluminum, tantalum (Ta), etc. too.

Figure 16:
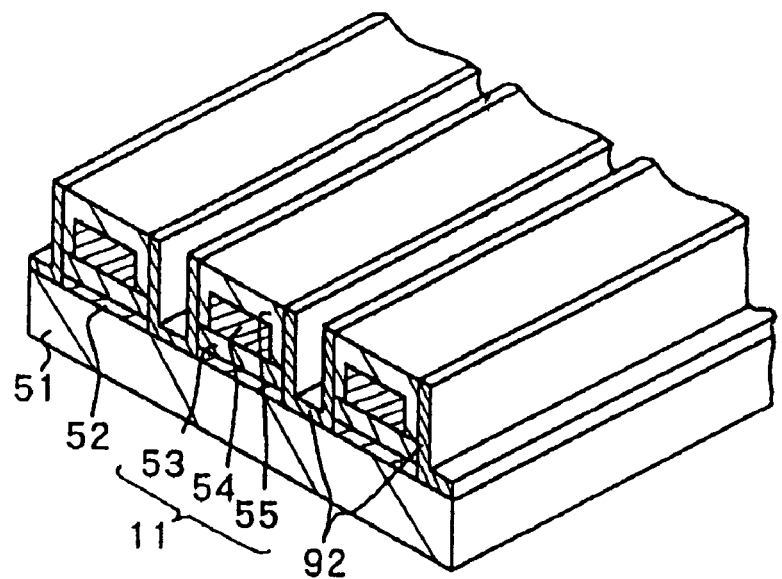
FIG. 16 is a partially cutaway perspective view for explaining a step of production following FIG. 15.

Next, as shown in FIG. 16, the peeling layers 91' made of the silicon dioxide are dissolved and removed by using for example a dilute hydrofluoric acid solution and thereby selectively remove the light blocking film 92 in contact with the peeling layers 91' (that is, on the optical waveguide paths 11') (lift-off process). By this, a state where only the upper surfaces of the optical waveguide paths 11' are exposed is exhibited.

Figure 17:
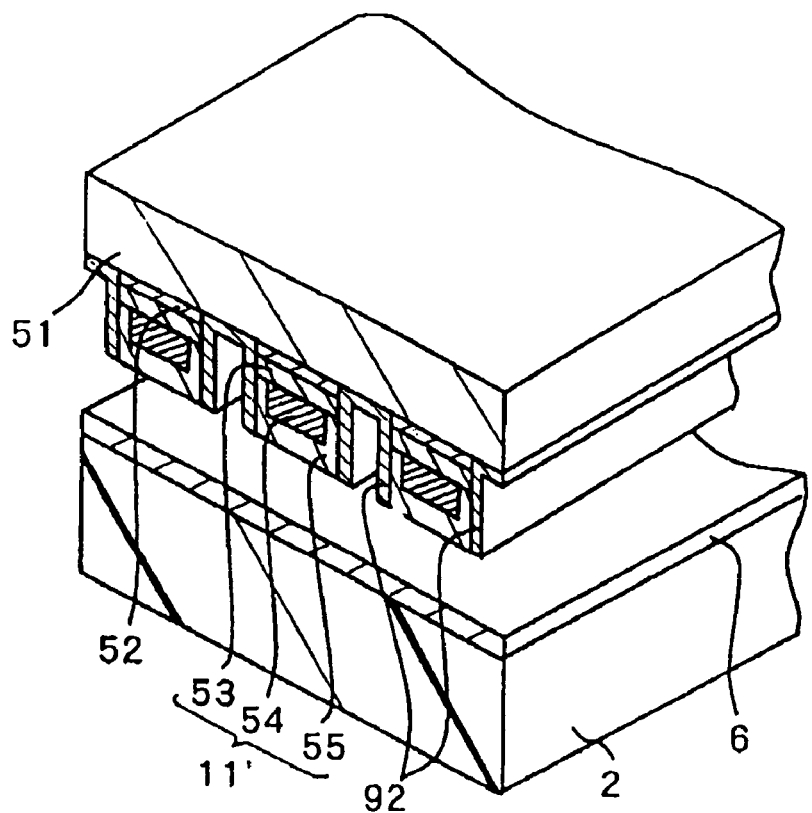
FIG. 17 is a partially cutaway perspective view for explaining a step of production following FIG. 16.

Next, as shown in FIG. 17, a multilayer circuit board 2 is prepared. A desired region on this multilayer circuit board 2 is formed with a bonding layer-6 having a thickness of about 10 µm made of a glass epoxy resin or other photo-curing resin by for example spin coating, dip coating, spraying, printing, or another process.

Figure 18:
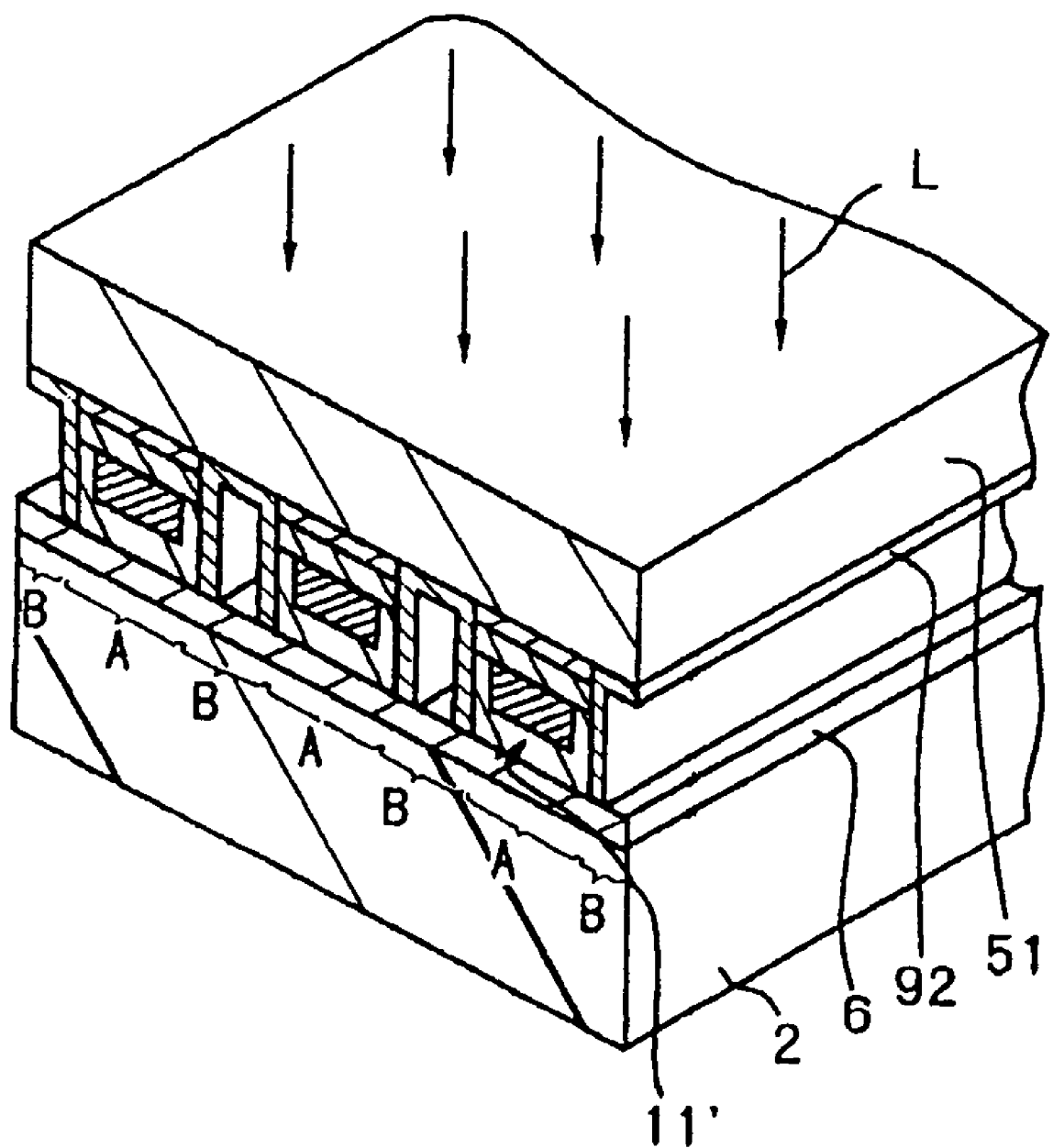
FIG. 18 is a partially cutaway perspective view for explaining a step of production following FIG. 17.

Next, as shown in FIG. 18, for example, in the same way as the step of production shown in FIGS. 9A and 9B of the first embodiment, the transparent substrate 51 on which the optical waveguide paths 11' are formed is turned upside down, the multilayer circuit board 2 is pressed against the optical waveguide paths 11', and light L is irradiated from the side of the transparent substrate 51 toward the direction of the multilayer circuit board 2. Here, the light blocking film 92 is not formed at the boundaries between the optical waveguide paths 11' and the bonding layer 6, but is formed only at the side surfaces of the optical waveguide paths 11' and the regions of the transparent substrate 51 facing the multilayer circuit board 2 where the optical waveguide paths 11' are not formed. Accordingly, the light L irradiated from the transparent substrate 51 side reaches the bonding layer 6 only in the regions A in which the optical waveguide paths 11' are formed and is blocked by the light blocking film 92 and does not reach the bonding layer 6 in another regions B. As a result, only the regions A of the bonding layer 6 under the optical waveguide paths 11' are cured, while the other regions B are left uncured. Then, by this cured bonding layer 6, the multilayer circuit board 2 is secured to the optical waveguide paths 11'.

Figure 19:
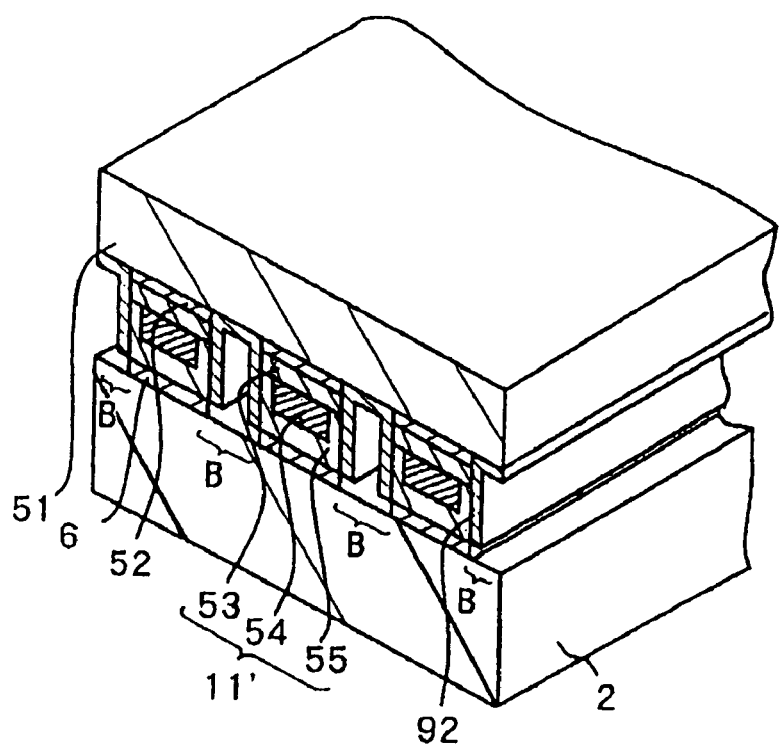
FIG. 19 is a partially cutaway perspective view for explaining a step of production following FIG. 18.

Next, as shown in FIG. 19, the resin of the regions B to which the light L is not irradiated due to the light blocking film 92 and which is left uncured is selectively dissolved and removed by for example acetone or ethanol.

Figure 20:
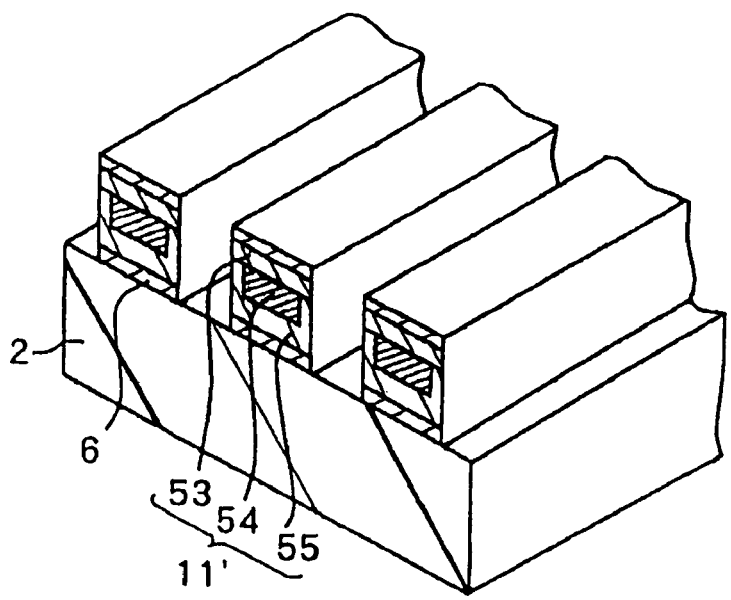
FIG. 20 is a partially cutaway perspective view for explaining a step of production following FIG. 19.

Next, as shown in FIG. 20, the light blocking film 92 made of chromium is dissolved by using for example an acidic solution (for example hydrochloric acid solution), then the substrate separation layer 52 is dissolved and removed by for example a process similar to the process of the step shown in FIGS. 11A and 11B of the first embodiment, whereby the optical waveguide paths 11' are transferred to the multilayer circuit board 2. The following steps are identical to those of the first embodiment.

In this way, in the present embodiment, a plurality of optical waveguide paths 11' separated from each other are formed on the transparent substrate 51 in advance and, at the same time, the uncured bonding layer 6 formed on the entire surface of the multilayer circuit board 2 and the optical waveguide paths 11' pressed against each other and only the bonding layer 6 under the optical waveguide paths 11' forming region is selectively cured by using the light blocking film 92, therefore the plurality of optical waveguide paths 11' on the transparent substrate 51 can be transferred to the multilayer circuit board 2 well. Namely, a plurality of optical waveguide paths 11' which are formed spaced from each other and have little light propagation loss can be arranged on the multilayer circuit board 2.

Further, here, the explanation was made of the case of forming a plurality of optical waveguide paths 11' of stripe shapes, but any shapes of optical waveguide paths 11' (for example, L-shapes, U-shapes, or arcs) formed on the transparent substrate 51 can be transferred to the multilayer circuit board 2 when using the method of production of the present embodiment. Also, the optical waveguide paths can be transferred to only required portions without transferring them to regions to which optical-waveguide paths should not be transferred. for example, the electrode forming regions of the multilayer circuit board 2.

Third Embodiment

The third embodiment of the present invention relates to a method for producing a optical waveguide path. The structure of the optical waveguide covered by the method is similar to that shown in FIG. 1. The method for producing the optical waveguide according to the present embodiment is similar to that of the first embodiment except for the point that the method for forming the inclined surfaces 11*a* and 11*b* of the optical waveguide path 11 is different. Below, the explanation will be made by referring to FIG. 21 through FIG. 23. Note that constituent elements the same as those of the first embodiment are given the same reference numerals and detailed explanations thereof are omitted.

Figure 21:
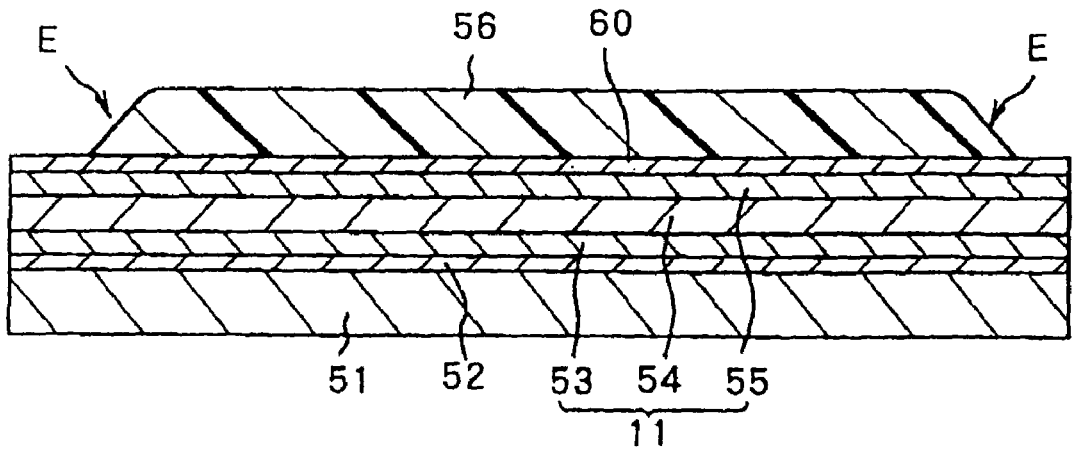
FIG. 21 is a sectional view for explaining a step of production of an optical waveguide according to a third embodiment of the present invention.

In the method for forming the inclined surfaces of the present embodiment, first, as shown in FIG. 21, an optical waveguide path 11 comprising the upper cladding layer 53, core layer 54, and the lower cladding layer 55 is formed on a transparent substrate 51 via the substrate separation layer 52. Next, a metal film 60 made of for example aluminum is formed by vapor deposition on the lower cladding layer 55. Next, a photoresist film 56 is formed on the metal film 60, then the photoresist film 56 is exposed and developed to form the desired photoresist pattern. Further, the photoresist film 56 is heat treated at a temperature more than for example the glass transition temperature, whereby the inclined surfaces E are formed at the edge parts of the photoresist film 56.

Figure 22:
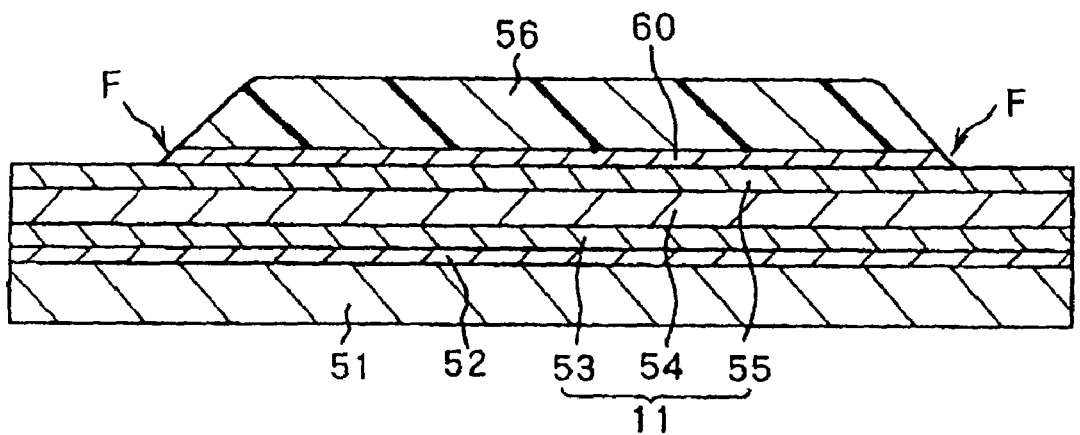
FIG. 22 is a sectional view for explaining a step of production following FIG. 21.
Figure 23:
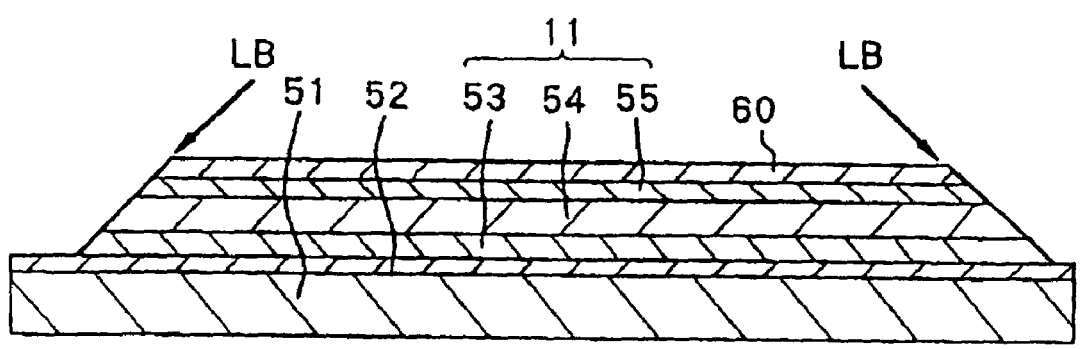
FIG. 23 is a sectional view for explaining a step of production following FIG. 22.

Next, as shown in FIG. 22, the metal film 60 is etched with the photoresist film 56 as the mask so as to process the two end portions of the metal film 60 to inclined surfaces F having shapes corresponding to the inclined surfaces E of the photoresist film 56.

Next, as shown in FIG. 22, for example a $CO_2$ gas laser or other laser beam LB is fired from a desired angle using the metal film 60 as the mask so as to cut the optical waveguide path 11. At this time, the cut surfaces which become the end portions of the optical waveguide path 11 are made to form inclined surfaces 11*a* and 11*b* inclined approximately 45° with respect to the longitudinal direction (light propagation direction) of the optical waveguide path 11. The following steps are similar to those of the first embodiment.

In this way, according to the present embodiment, the inclined surfaces 11*a* and 11*b* of the end portions of the optical waveguide path 11 are formed by cutting the optical waveguide path 11 by firing the laser beam LB from a predetermined angle, therefore they can be formed more precisely and easily than the case where the inclined surfaces 11*a* and 11*b* are formed by only the thin film formation process.

Fourth Embodiment

The fourth embodiment of the present invention relates to a method for producing an optical waveguide path. The structure of the optical waveguide covered by the method is similar to that shown in FIG. 1. The method for producing the optical waveguide according to the present embodiment is similar to that of the first embodiment except for the point that the method for forming the inclined surfaces 11a and 11b of the optical waveguide path 11 is different. Below, the explanation will be made by referring to FIG. 24 through FIG. 27. Note that constituent elements the same as those of the first embodiment are given the same reference numerals and detailed explanations thereof are omitted.

Figure 24:
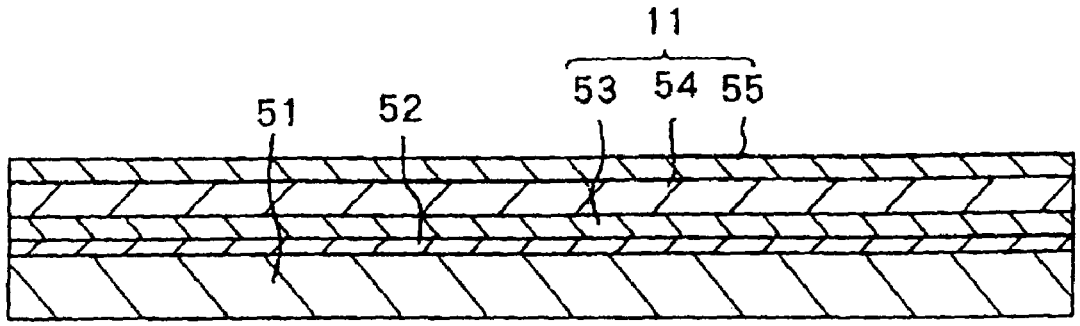
FIG. 24 is a sectional view for explaining a step of production of an optical waveguide according to a fourth embodiment of the present invention.

In the present embodiment, first, as shown in FIG. 24, a process similar to that for the first embodiment is used to form a substrate separation layer 52 on a transparent substrate 51 and to form an optical waveguide path 11 comprising the upper cladding layer 53, core layer 54, and the lower cladding layer 55 on this.

Figure 25:
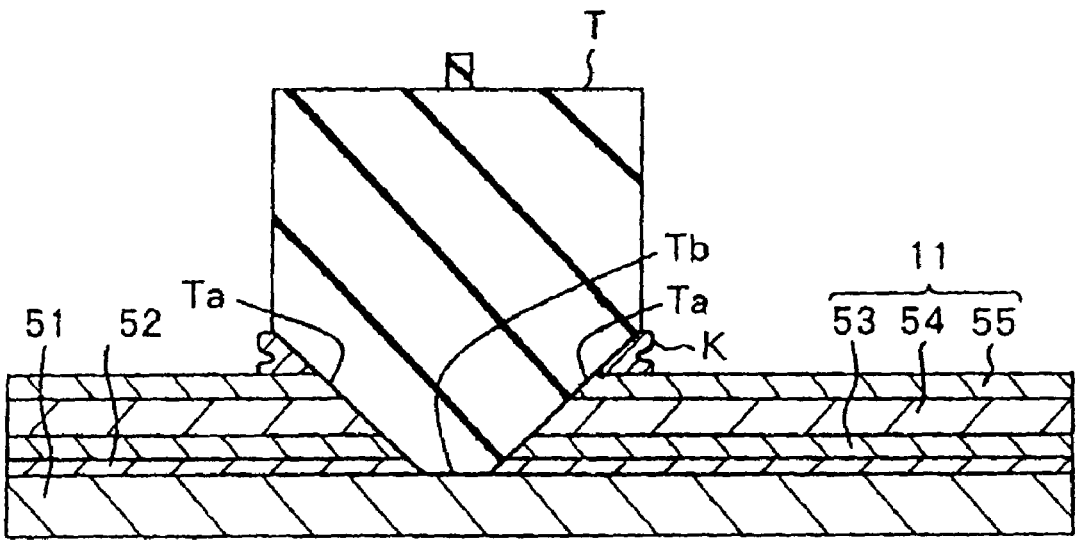
FIG. 25 is a sectional view for explaining a step of production following FIG. 24.

Next, as shown in FIG. 25, a heat tool T having two chamfered slopes Ta inclined approximately 45° with respect to the tip surface Tb is prepared. This heat tool T is heated to a temperature more than the glass transition temperature of the resin material constituting the upper cladding layer 53, core layer 54, and the lower cladding layer 55 constituting the optical waveguide path 11. Then, the tip of the heated heat tool T is pressed against the multilayer circuit board 2 to melt the optical waveguide path 11. If necessary, the heat tool T may be moved in a direction along the main surface of the multilayer circuit board 2.

Figure 26:
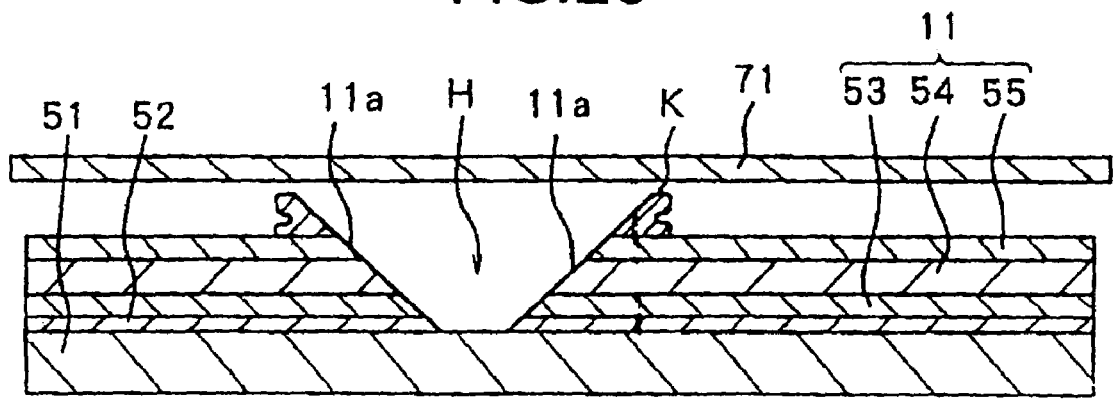
FIG. 26 is a sectional view for explaining a step of production following FIG. 25.
Figure 27:
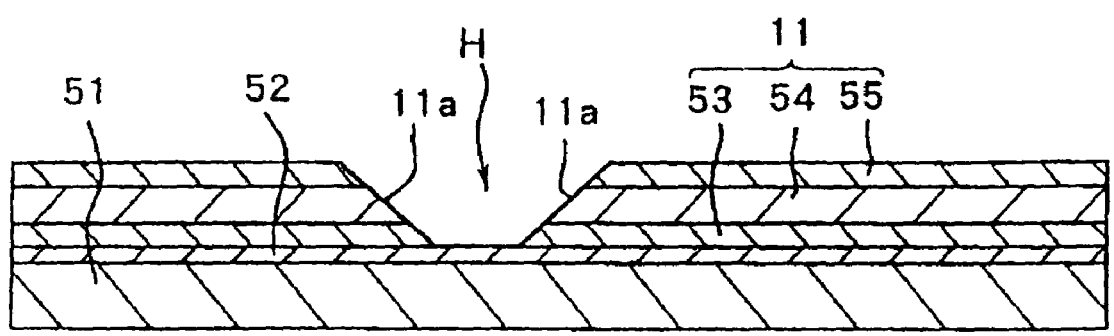
FIG. 27 is a sectional view for explaining a step of production following FIG. 26.

Next, as shown in FIG. 26, the heat tool T is removed from the multilayer circuit board 2, whereby a depression H is formed in the region in which the optical waveguide path 11 is melted. Thus, the inner surfaces of the depression H become the inclined surfaces 11a and 11b inclined approximately 45° with respect to the longitudinal direction of the optical waveguide path 11. Note that scum K is produced around the depression H due to heat deformation. For this reason, the surface of the substrate 51 where the scum K is formed is lightly polished by pressing it against the polishing surface of a grinding substrate 71. By this polishing, as shown in FIG. 27, the scum K around the depression H is removed and, at the same time, the upper surface of the optical waveguide path 11 is flattened. Finally, washing and drying treatment are performed, whereby the inclined surfaces 11a and 11b of the optical waveguide path 11 are completed. The following steps are similar to those of the first embodiment.

In this way, according to the present embodiment, the inclined surfaces 11a and 11b of the optical waveguide path 11 are formed by the slopes Ta of the heat tool T, therefore these inclined surfaces 11a and 11b can be formed at an identical inclination angle to that of the slopes Ta of the heat tool T and the precision of the inclined surfaces 11a and 11b can be raised.

Fifth Embodiment

The fifth embodiment of the present invention relates to a method for producing an optical waveguide path. The structure of the optical waveguide covered by the method is similar to that shown in FIG. 1. The method for producing the optical waveguide according to the present embodiment is similar to that of the first embodiment except for the point that the method for forming the inclined surfaces 11a and 11b of the optical waveguide path 11 is different. Below, the explanation will be made by referring to FIG. 28 through FIG. 30. Note that constituent elements the same as those of the first embodiment are given the same reference numerals and detailed explanations thereof are omitted.

Figure 28:
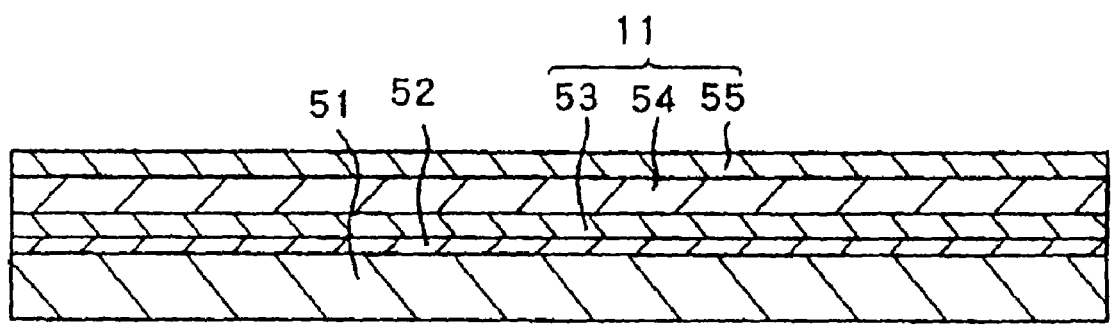
FIG. 28 is a sectional view for explaining a step of production of an optical waveguide according to a fifth embodiment of the present invention.

In the present embodiment, first, as shown in FIG. 28, a process similar to that for the first embodiment is used to form a substrate separation layer 52 on a transparent substrate 51 and to form an optical waveguide path 11 comprising the upper cladding layer 53, core layer 54, and the lower cladding layer 55 on this.

Figure 29:
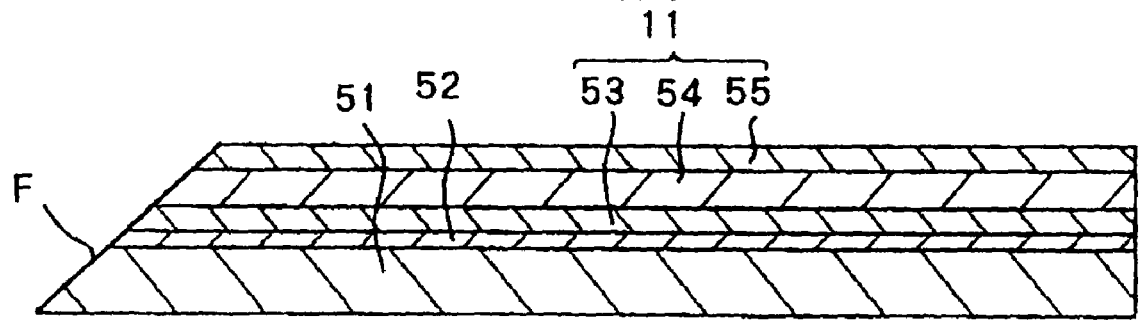
FIG. 29 is a sectional view for explaining a step of production following FIG. 28.

Next, as shown in FIG. 29, the transparent substrate 51 on which the optical waveguide path 11 is formed is cut at an angle of 45° with respect to the longitudinal direction of the optical waveguide path 11 (light propagation direction) by for example a dicing saw or other cutting means (F portion of FIG. 29).

Figure 30:
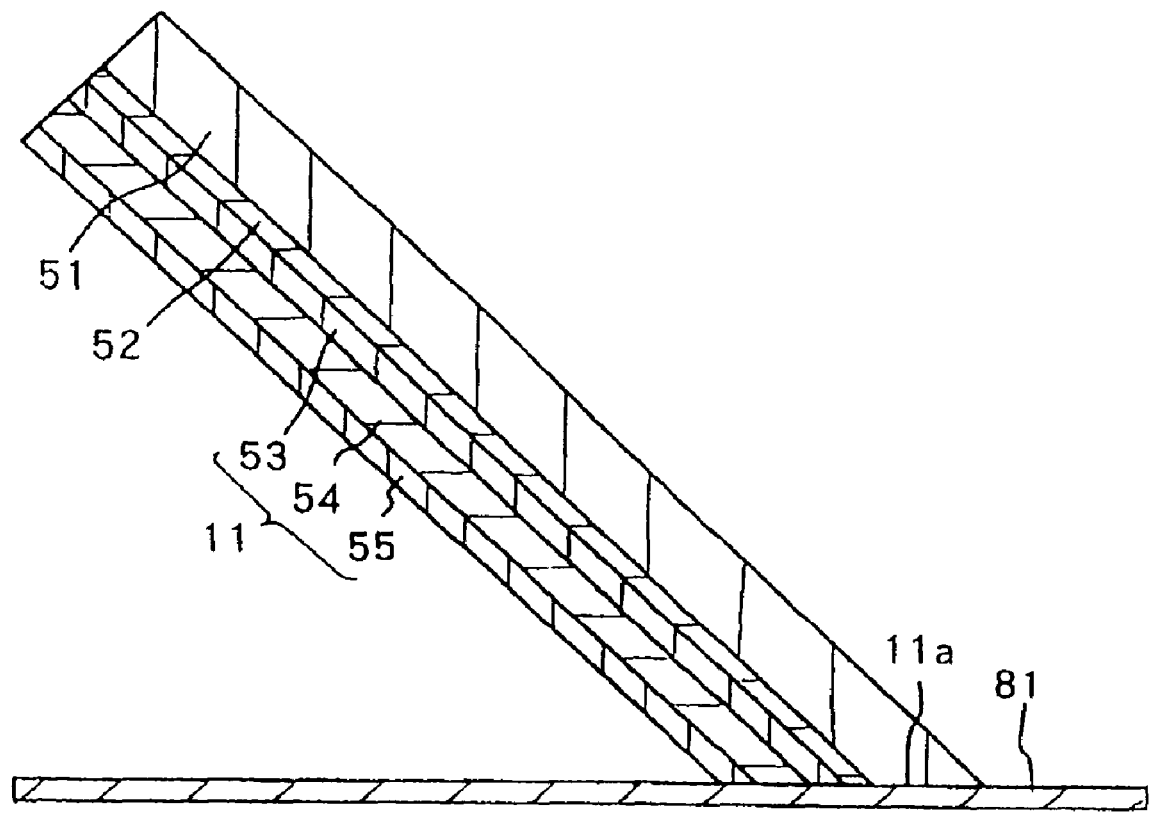
FIG. 30 is a sectional view for explaining a step of production following FIG. 29.

Next, as shown in FIG. 30, the cut transparent substrate 51 is inclined at an angle of 45° with respect to a grinding substrate 81, then the cut surface of the transparent substrate 51 brought into contact with the grinding surface of the grind substrate 81 to grind it. By this, an inclined surface 11a inclined 45° with respect to the longitudinal direction of the optical waveguide path 11 can be formed at one end portion of the optical waveguide path 11. The following steps are similar to those of the first embodiment.

In this way, according to the present embodiment, the inclined surface 11a of the optical waveguide path 11 is mechanically ground, therefore the precision of the inclined surface 11a can be raised. Note that the method for forming this inclined surface 11a is convenient since end machining of a plurality of optical waveguide paths 11 arranged along the main surface of a transparent substrate 51 can be carried out together.

Sixth Embodiment

Figure 31:
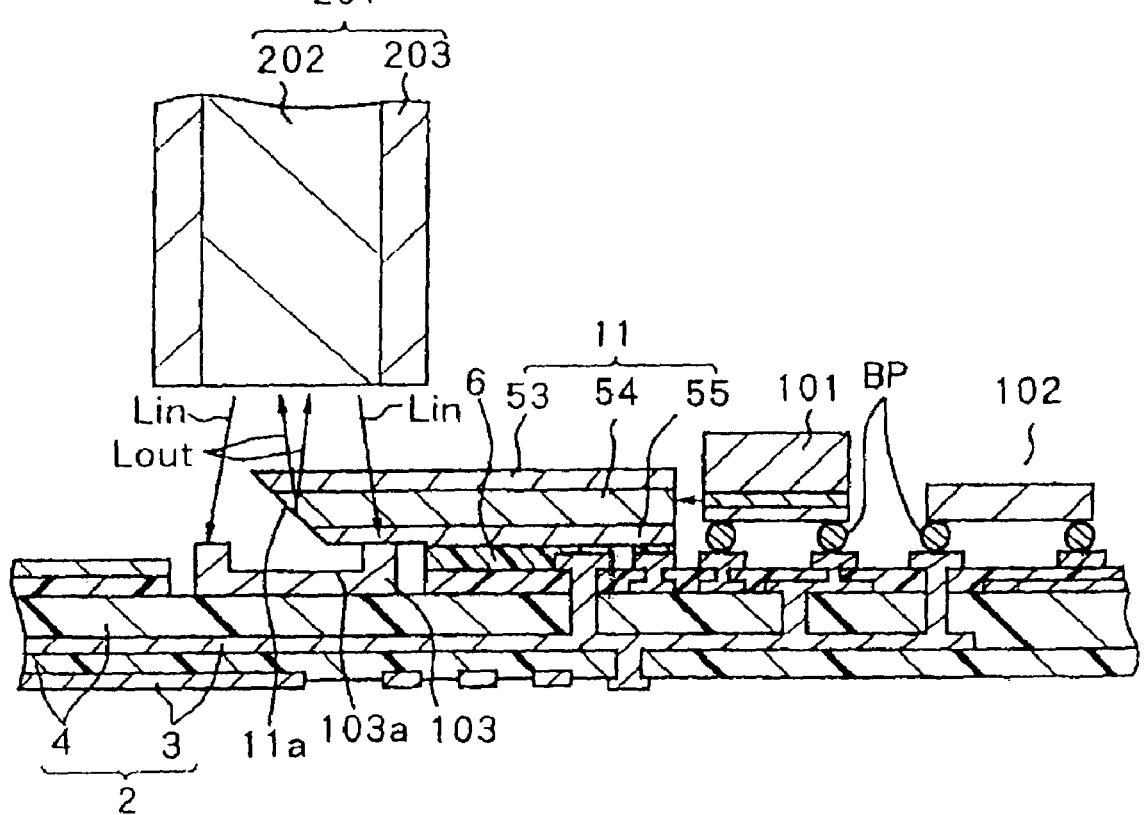
FIG. 31 is a sectional view of the configuration of an optical waveguide according to a sixth embodiment of the present invention.
Figure 32:
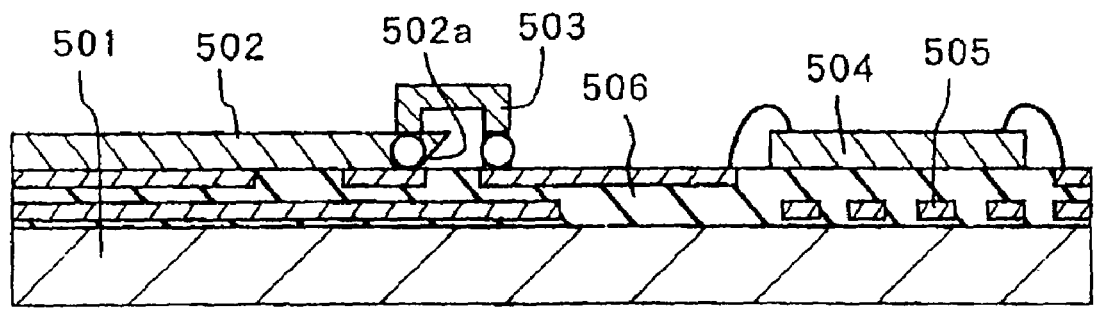
FIG. 32 is a sectional view of an example of the configuration of an optical waveguide of the related art.

The sixth embodiment of the present invention relates to an optical waveguide constituted as an optical module for performing the transfer of data through a single-core optical fiber. FIG. 31 is a view of the sectional structure of the optical waveguide according to the present embodiment. Note that constituent elements the same as those of the first embodiment are given the same reference numerals and detailed explanations thereof are omitted.

This optical waveguide is provided with a multilayer circuit board 2 (for example, a glass epoxy multilayer circuit board), an optical waveguide path 11 formed on the multilayer circuit board 2, an end face emitting type laser diode 101 as the light emitting element for transmission and an IC chip 102 mounted on the multilayer circuit board 2 via the bumps BP, a light receiving element 103 embedded in the multilayer circuit board 2, and a single-core optical fiber 201 arranged at a position facing the light receiving element 103 on the multilayer circuit board 2. Further, the drive circuit of the laser diode 101 and a trans-impedance amplifier and other receiving circuits and other circuits and parts can be mounted (not illustrated) on the multilayer circuit board 2 as well.

The optical waveguide path 11 is transferred onto the multilayer circuit board 2 by the method of the first embodiment and secured to the multilayer circuit board 2 by a bonding layer 6 serving also as a passivation film made of resin. One end of the optical waveguide path 11 is formed with an inclined surface 11a giving an outer angle with the surface of the multilayer circuit board 2 of approximately 45° and serving as a reflection surface. The optical waveguide path 11 is positioned so that the inclined surface 11a is positioned at the center portion of the light receiving element 103. The light receiving element 103 has a sensitivity with respect to the wavelength of the received light.

The single-core optical fiber 201 is constituted by a fiber core layer 202 formed inside and a fiber cladding layer 203 formed on the outer circumference of the fiber core layer 202 and is provided so that one end portion is spaced exactly a predetermined distance from the light receiving element 103. The diameter of the fiber core layer 202 is made sufficiently large in comparison with the size of the inclined surface 11a.

In this optical waveguide, a light signal output from the laser diode 101 is input to the optical waveguide path 11, propagated through the optical waveguide path 11, and reflected at the inclined surface 11a and introduced into the single-core optical fiber 201 as the emitted light Lout with a good efficiency. Further, the incident light Lin output from the single-core optical fiber 201 is irradiated over a wide region of the multilayer circuit board 2 including the inclined surface 11a of the optical waveguide path 11, but the amount of the light bounced back at the inclined surface 11a is very small. Most of the incident light Lin is absorbed into a light receiving portion 103a of the light receiving element 103, therefore it is possible to perform the reception with a good efficiency.

In this way, according to the present embodiment, the degree of freedom of the arrangement between the single-core optical fiber 201, light receiving element 103, and the laser diode 101 becomes large and it is possible to obtain an optical module at a low cost and with a good efficiency.

While the present invention was explained above by giving preferred embodiments, the present invention is not limited to the embodiments and can be modified in various ways. For example, in the embodiments, a structure in which the lower cladding layer 55 of the optical waveguide path 11 was bonded onto the bonding layer 6 was adopted, but if the bonding layer 6 is constituted by a material achieving the same function as that of the lower cladding layer 55, a structure in which the lower cladding layer 55 acts also as the bonding layer 6 can be obtained. Further, for the upper cladding layer 53, when transferring the optical waveguide path 11 to the multilayer circuit board 2, it is also possible to obtain a structure utilizing air as the cladding layer and therefore in which the upper cladding layer 53 is not formed. As a result, the process of formation of the optical waveguide path 11 can be simplified, and the manufacturing cost can be lowered.

Further, in the first embodiment, the explanation was made of the case where a photo-curing resin was used as the material for forming the bonding layer 6, but it is also possible to use a heat-curing resin. In this case, the optical waveguide path 11 is formed on the transparent substrate 51, then a bonding layer 6 made of a heat-curing resin such as an epoxy resin or acrylic resin is formed at the desired region on the multilayer circuit board 2 by for example printing and is heated in the state where the multilayer circuit board 2 is pressed against the optical waveguide path 11 on the transparent substrate 51. By this, the heat-curing resin constituting the bonding layer 6 is cured, and the multilayer circuit board 2 is secured to the optical waveguide path 11. In this case, the substrate for forming the optical waveguide path (first substrate in the present invention) need not be a light transmitting type. Note that to facilitate the positioning at the time of transfer, however, preferably a transparent substrate is used.

Further, in the embodiments, silicon dioxide was used as the material for forming the substrate separation layer 52 and, at the same time, this substrate separation layer 52 was dissolved and removed by dipping this in a dilute hydrofluoric acid solution or buffered hydrofluoric acid solution, but it is also possible to dissolve the substrate separation layer 52 by spraying an organic solvent such as acetone or isopropyl alcohol and then separate the substrate separation layer 52 and the optical waveguide path 11 at the boundary thereof. Further, it is also possible to form the substrate separation layer 52 by aluminum (Al) or copper or another metal material which can be wet etched and to dissolve and remove this substrate separation layer 52 by using dilute hydrochloric acid (HCl), sodium hydroxide (NaOH), potassium hydroxide (KOH), or another solution.

Further, in the embodiments, quartz glass or another light transmitting material was used as the transparent substrate 51, but it is also possible to use a photosensitive glass or other material which has a light transmitting property and can be dissolved. In this case, the photosensitive glass is dissolved when dipping the same in a 5 volt or less dilute hydrofluoric acid solution, therefore the substrate separation layer 52 becomes unnecessary.

Further, in the embodiments, the light reflecting portions (inclined surfaces 11a, 11b) were provided on the entire end surfaces of the optical waveguide path 11, but they may also be provided only on the end surfaces of the core layer 54.

Summarizing the effects of the present invention, as explained above, according to the optical waveguide of one aspect of the present invention, since the optical waveguide path is separately formed in advance and then this optical waveguide path is arranged on the substrate and secured, unlike the case where the optical waveguide path is directly formed on the substrate, it becomes possible to secure constant characteristics being influenced by the type and shape of the substrate supporting the optical waveguide path. Accordingly, there is the effect that the optical waveguide it can be constituted by using any substrate.

Particularly, according to the optical waveguide of another aspect of the present invention, since at least one of the optical waveguide path, light emitting element, and the light receiving element and the integrated circuits are provided on a substrate formed with the electrical wiring, it is possible to selectively use the transmission format in accordance with the purpose and object, for example, transmitting a signal which has to be transmitted at a high speed as a light signal, while transmitting a signal which can be transmitted at a relatively low speed as an electrical signal. For this reason, the propagation delay of the signal, which becomes the disadvantage when a signal is transmitted by electrical wiring, is eliminated and, at the same time, the influence of electromagnetic noise becomes small and, as a result, malfunctions due to disturbances in the waveform can be effectively prevented. Accordingly, use of this optical waveguide enables the transfer of signals at a high speed, the realization of which has been difficult by only electrical wiring, and enables a great improvement in the performances of the system and the network.

Further, according to the method for producing an optical waveguide of still another aspect of the present invention, since the optical waveguide path formed on the first substrate is transferred to the second substrate, there is the effect that an optical waveguide path which could be formed only on an expensive substrate excellent in the heat resistance in the related art can be formed on a cheaper substrate made of any material and having any shape. Further, by using a substrate excellent in flatness as the first substrate, an optical waveguide path with little light propagation loss can be obtained.

Particularly, according to the method for producing an optical waveguide of still another aspect of the present invention, since a plurality of optical waveguide paths spaced from each other are formed on the first substrate, the second substrate is pressed against these optical waveguide paths via the bonding layer, and only the regions in the bonding layer corresponding to the regions in which the optical waveguide paths are formed are selectively exposed and cured, a plurality of optical waveguide paths spaced from each other can be transferred to the desired regions of any substrate.

Further, according to the method for producing an optical waveguide of still another aspect of the present invention, since an electrical wiring board formed in advance by a thick film process is used as the second substrate, the optical waveguide can be produced more easily and cheaply than the case where the electrical wiring is formed on a substrate by using thin film technology and then the optical waveguide path is formed on this.

Particularly, according to the method for producing an optical waveguide of still another aspect of the present invention, since, as the material for forming the first and second cladding layers, one containing at least one material selected from a polyimide, epoxy resin, acrylic resin, polyolefin resin, and synthetic rubber cheaper than quartz is used, the cost of the materials of the optical waveguide path can be reduced.

Further, according to the method for producing an optical waveguide of still another aspect of the present invention, since the inclined surface of at least one end portion of the optical waveguide path is formed by irradiating a laser beam at a predetermined angle to cut the optical waveguide path, the inclined surface can be more precisely and easily formed than the case where it is formed by only a thin film formation process.

Further, according to the method for producing an optical waveguide of still another aspect of the present invention, since at least one end surface of the optical waveguide path is processed to an inclined surface by heating a heat tool having an inclined surface of a predetermined angle at the tip and pressing this into the optical waveguide path, the inclined surface of the optical waveguide path can be formed at the identical inclination angle to that of the inclined surface of the heat tool and the precision thereof can be raised.

Further, according to the method for producing an optical waveguide of still another aspect of the present invention, since the first substrate on which the optical waveguide path is formed is cut at a predetermined angle and then the end surface formed by the cutting of the first substrate is ground to form the inclined surface of the optical waveguide path, the precision of the inclined surface can be raised.

Further, according to the optical waveguide of still another aspect of the present invention, since the optical waveguide path is utilized as a spacer interposed between at least one of the light emitting element and light receiving element and the integrated circuits and the second substrate, at least one of the light emitting element and light receiving element and the integrated circuits can be stably secured on the second substrate.

What is claimed is:

1. A method of producing an optical waveguide comprising the steps of:
    forming an optical waveguide path using a first substrate as a supporting base;
    securing the optical waveguide path supported by the first substrate and a second substrate;
    removing the first substrate so as to transfer the optical waveguide path to the second substrate;
    forming on said second substrate at least one of a light emitting element for converting an electrical signal to a light signal and a light receiving element for converting a light signal to an electrical signal; and
    forming on said second substrate an integrated circuit for transferring an electrical signal with said at least one of the light emitting element and light receiving element,
    wherein said second substrate comprises an electrical circuit board formed with electrical wiring, and
    wherein said step of forming an optical waveguide path using said first substrate as a supporting base includes:
    a step of forming a substrate separation layer on said first substrate so as to enable the first substrate and the optical waveguide path to be separated, and
    a step of forming an optical waveguide path on said substrate separation layer, the optical waveguide path being formed to have an inclined surface at least at one end of the optical waveguide path.

2. A method of producing an optical waveguide as set forth in claim 1, wherein said step of forming said optical waveguide path includes:
    a step of forming a first cladding layer on said substrate separation layer,
    a step of forming a core layer on said first cladding layer, and
    a step of forming a second cladding layer on said core layer.

3. A method of producing an optical waveguide as set forth in claim 2, wherein the material for forming the first and second cladding layers, has a refractive index of light smaller than that of the material forming the core layer.

4. A method of producing an optical waveguide as set forth in claim 2, wherein the material forming the first and second cladding layers includes as a main ingredient at least one material selected from the group comprising a polyimide, epoxy resin, acryl resin, polyolefin resin, and synthetic rubber.

5. A method of producing an optical waveguide as set forth in claim 1, wherein the material forming the substrate separate layer includes silicon dioxide ($SiO_2$).

6. A method of producing an optical waveguide as set forth in claim 1, wherein the material forming the substrate separation layer includes an etchable metal material.

7. A method of producing an optical waveguide as set forth in claim 1, wherein said step of forming an inclined surface at least at one end of the optical waveguide path includes:
    a step of coating the optical waveguide path with a photoresist and exposing and developing the photoresist so as to form a desired photoresist pattern,
    a step of inclining an edge region of the photoresist pattern,
    a step of using the photoresist pattern as a mask and anistropically etching the portion of the optical waveguide path exposed from the edge region of the photoresist pattern to make the end of the optical waveguide path a tapered inclined surface, and
    a step of removing the photoresist pattern.

8. A method of producing an optical waveguide as set forth in claim 1, wherein said step of forming an inclined surface at least at one end of the optical waveguide path includes:
    a step of vapor depositing on the optical waveguide path a metal film,
    a step of coating the metal film with a photoresist and exposing and developing the photoresist so as to form a desired photoresist pattern, a step of using the photoresist pattern as a mask and etching the meal film to form a desired pattern, a step of using the metal film as a mask and irradiating a laser beam on a predetermined region of the optical waveguide path from a predetermined angle to cut the optical waveguide path, and a step of removing the metal film by etching and cleaning the processed product as a whole.

9. A method of producing an optical waveguide as set forth in claim 1, wherein said step of forming an inclined surface at least at one end of the optical waveguide path includes:

a step of heating a heat tool having an inclined surface at its tip and pressing the tip of the heat tool into the optical waveguide path so as to form said inclined surface in the optical waveguide path and a step of removing the heat tool and then polishing off scum produced at the melted portion of the optical waveguide path.

10. A method of producing an optical waveguide as set forth in claim 1, wherein said step of forming an inclined surface at least at one end of the optical waveguide path includes:

a step of cutting the first substrate at a predetermined angle and a step of polishing an end surface formed by the cutting of the first substrate so as to form the end surface of the optical waveguide path into an inclined surface.

11. A method of producing an optical waveguide comprising the steps of:

forming an optical waveguide path using a first substrate as a supporting base;

securing the optical waveguide path supported by the first substrate and a second substrate;

removing the first substrate so as to transfer the optical waveguide path to the second substrate;

forming on said second substrate at least one of a light emitting element for converting an electrical signal to a light signal and a light receiving element for converting a light signal to an electrical signal; and forming on said second substrate an integrated circuit for transferring an electrical signal with said at least one of the light emitting element and light receiving element, wherein said second substrate comprises an electrical circuit board formed with electrical wiring, wherein a substrate comprised of a light transmitting material able to pass light is used as the first substrate, and wherein said step of securing the second substrate to the optical waveguide path includes:

a step of forming at a predetermined position on the second substrate a bonding layer comprised of a photo-curing resin which cures by irradiation of light, a step of bringing the bonding layer of the second substrate into close contact with the optical waveguide path formed on the first substrate, and a step of irradiating light from the back of the first substrate toward the second substrate to cure the bonding layer.

12. A method of producing an optical waveguide comprising the steps of:

forming an optical waveguide path using a first substrate as a supporting base;

securing the optical waveguide path supported by the first substrate and a second substrate;

removing the first substrate so as to transfer the optical waveguide path to the second substrate;

forming on said second substrate at least one of a light emitting element for converting an electrical signal to a light signal and a light receiving element for converting a light signal to an electrical signal; and forming on said second substrate an integrated circuit for transferring an electrical signal with said at least one of the light emitting element and light receiving element, wherein said second substrate comprises an electrical circuit board formed with electrical wiring, and wherein said step of securing the second substrate to the optical waveguide path includes:

a step of forming at a predetermined position on the second substrate a bonding layer comprised of a heat-curing resin, a step of bringing the bonding layer of the second substrate into close contact with the optical waveguide path formed on the first substrate, and a step of heating the first substrate and the second substrate as a whole to cure the bonding layer.

13. A method of producing an optical waveguide as set forth in claim 1, wherein, in the step of removing the first substrate to transfer the optical waveguide path to the second substrate, a solvent is supplied between the bonded first substrate and second substrate to remove the substrate separation layer and then the first substrate is separated from the optical waveguide path.

14. A method of producing an optical waveguide as set forth in claim 1, wherein, in the step of removing the first substrate to transfer the optical waveguide path to the second substrate, a solvent is supplied between the bonded first substrate and second substrate to separate the boundary between the substrate separation layer and the optical waveguide path.

15. A method of producing an optical waveguide comprising the steps of:

forming an optical waveguide path using a first substrate as a supporting base;

securing the optical waveguide path supported by the first substrate and a second substrate;

removing the first substrate so as to transfer the optical waveguide path to the second substrate;

forming on said second substrate at least one of a light emitting element for converting an electrical signal to a light signal and a light receiving element for converting a light signal to an electrical signal; and forming on said second substrate an integrated circuit for transferring an electrical signal with said at least one of the light emitting element and light receiving element, wherein said second substrate comprises an electrical circuit board formed with electrical wiring, wherein spherical portions formed on tips of fine gold wires are pressed against electrodes of the at least one of the light emitting element and light receiving element and said integrated circuit, then the spherical portions and the fine gold wires are pulled apart to cut them and thereby form the connection electrodes, wherein said at least one of the light emitting element and light receiving element and said integrated circuit have connection electrodes, and wherein, in said step of forming the at least one of the light emitting element and light receiving element and said step of forming said integrated circuit, at least one of the light emitting element and light receiving element and the integrated circuit are mounted on the second substrate by flip chip bonding using said connection electrodes.

* * * * *